(12) United States Patent
Abramov

(10) Patent No.: US 11,338,858 B2
(45) Date of Patent: May 24, 2022

(54) VEHICLE WITH A FRONT AND/OR REAR STEERING MECHANISM, BASED ON APPLICATION OF A LATERAL, HORIZONTAL FORCE ON THE VEHICLE'S CHASSIS

(71) Applicant: D. S. RAIDER LTD., Moshav Hagor (IL)

(72) Inventor: Erez Abramov, Moshav Hagor (IL)

(73) Assignee: D. S. RAIDER LTD., Kefar Saba (IL)

( * ) Notice: Subject to any disclaimer, the term of this patent is extended or adjusted under 35 U.S.C. 154(b) by 0 days.

(21) Appl. No.: 17/137,104

(22) Filed: Dec. 29, 2020

(65) Prior Publication Data

US 2021/0179177 A1 Jun. 17, 2021

Related U.S. Application Data

(63) Continuation-in-part of application No. 16/326,953, filed as application No. PCT/IL2017/050924 on Aug. 20, 2017, now Pat. No. 10,894,456.

(60) Provisional application No. 62/377,657, filed on Aug. 21, 2016.

(51) Int. Cl.
 *B62D 21/11* (2006.01)
 *B60L 15/20* (2006.01)
 *B60K 1/02* (2006.01)
 *B62D 27/02* (2006.01)

(52) U.S. Cl.
 CPC .............. *B62D 21/11* (2013.01); *B60K 1/02* (2013.01); *B60L 15/20* (2013.01); *B62D 27/023* (2013.01)

(58) Field of Classification Search
 None
 See application file for complete search history.

(56) References Cited

U.S. PATENT DOCUMENTS

| 4,043,585 A | 8/1977 | Yamanaka |
| 6,739,603 B1 | 5/2004 | Powell |
| 7,866,432 B2 * | 1/2011 | Xie .......................... B60L 50/66 180/252 |
| 8,020,878 B2 | 9/2011 | Hara et al. |
| 9,248,857 B2 | 2/2016 | Spahl |
| 10,501,119 B2 | 12/2019 | Doerksen et al. |

(Continued)

FOREIGN PATENT DOCUMENTS

| CN | 108849810 A | * 11/2018 |
| CN | 113002625 A | * 6/2021 |

(Continued)

*Primary Examiner* — Faye M Fleming
(74) *Attorney, Agent, or Firm* — Browdy and Neimark, P.L.L.C.

(57) ABSTRACT

A dynamic joint structure (DJS) for movably connecting a wheel set to a chassis of a vehicle, and a vehicle including a front such DJS and a rear such DJS. The DJS includes an upper suspension plate having at least one upper recess with an upper opening; a middle suspension plate having at least one middle recess with a middle opening; and at least one connector assembly including: (i) an elongated bolt defining an insert axis "Zi" along its longer side; and (ii) a restriction unit configured to restrict the movement of the bolt over an XiYi plane that is perpendicular to Zi, for enhancing translation of tilting movements of the chassis of the vehicle into steering movements of the vehicle's wheels set to which the DJS connects.

13 Claims, 19 Drawing Sheets

(56) References Cited

U.S. PATENT DOCUMENTS

| | | |
|---|---|---|
| 2003/0141689 A1 | 7/2003 | Hamy |
| 2004/0036243 A1 | 2/2004 | Chang |
| 2008/0111336 A1 | 5/2008 | Aubarede |
| 2011/0272900 A1 | 11/2011 | Lares |
| 2013/0161919 A1 | 6/2013 | Gaillard-Groleas |
| 2016/0152296 A1 | 6/2016 | Eckert |
| 2018/0257728 A1 | 9/2018 | Kanehara et al. |
| 2020/0102037 A1 | 4/2020 | Hirayama |

FOREIGN PATENT DOCUMENTS

| | | |
|---|---|---|
| FR | 2968626 A1 | 6/2012 |
| FR | 2996205 A1 | 4/2014 |
| JP | 20000261023 A | 2/2000 |

\* cited by examiner

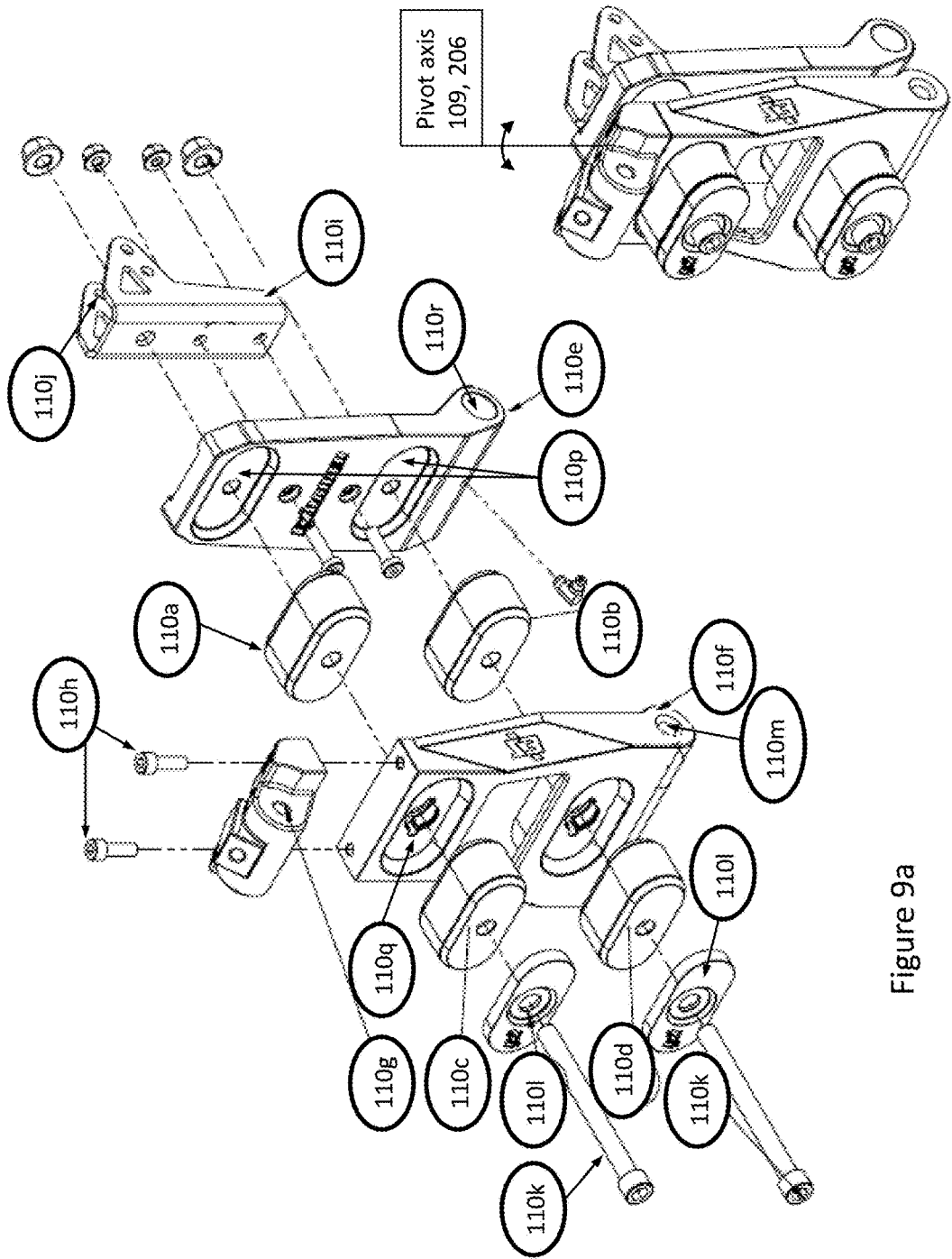

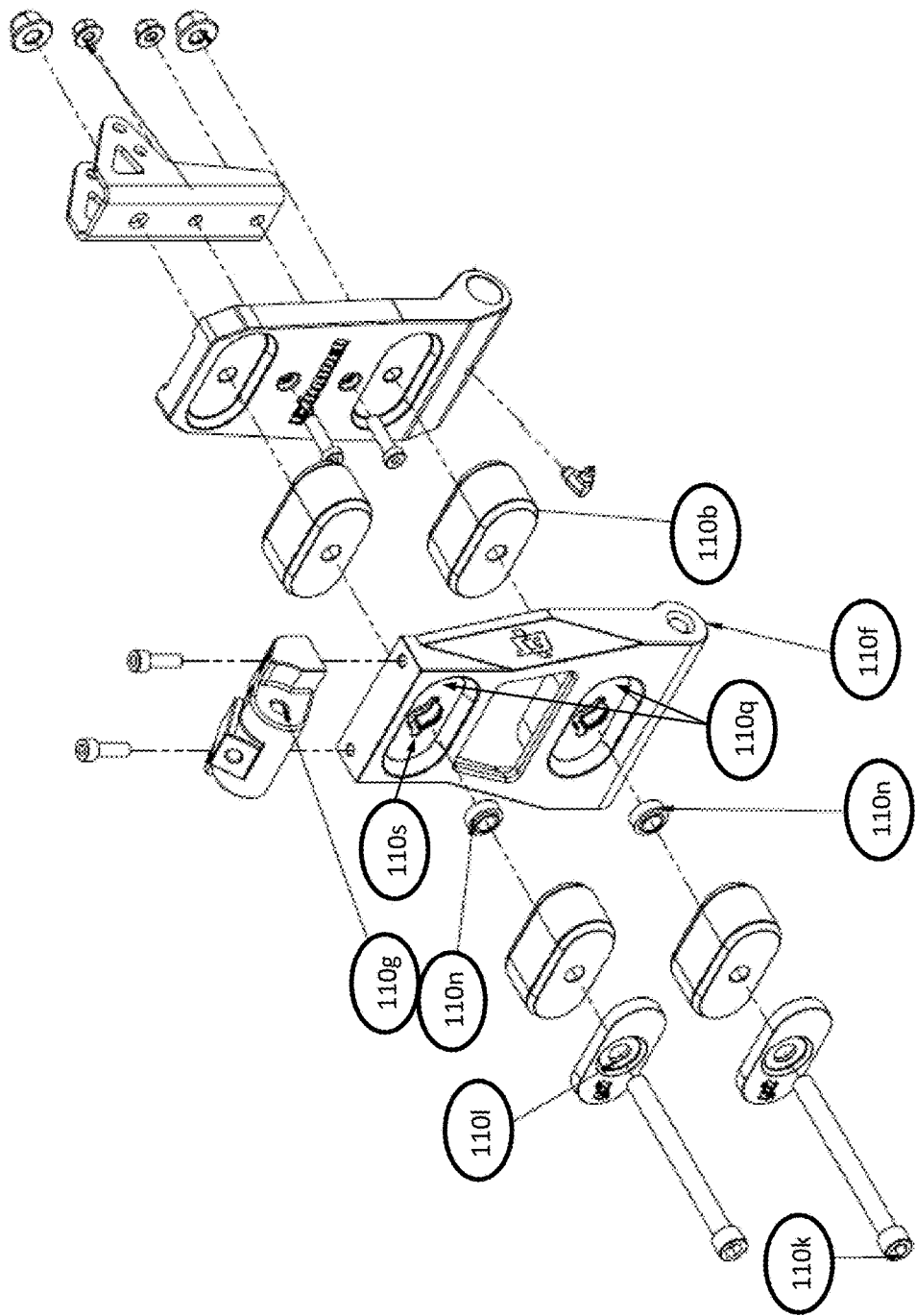

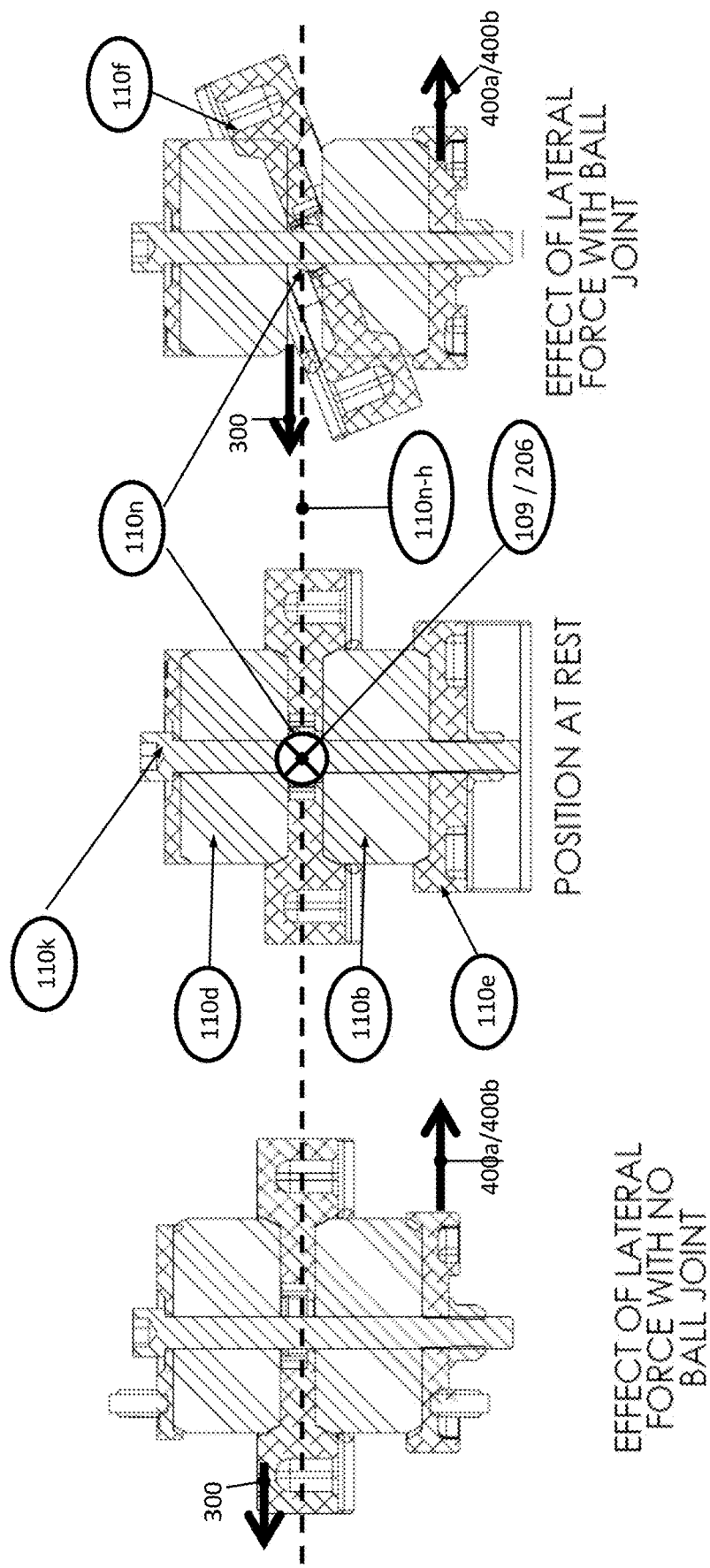

VEHICLE WITH A FRONT AND/OR REAR STEERING MECHANISM, BASED ON APPLICATION OF A LATERAL, HORIZONTAL FORCE ON THE VEHICLE'S CHASSIS

FIELD OF THE INVENTION

The present invention generally relates to steering mechanisms for vehicles, and more particularly to combining front and rear wheel steering by applying a lateral, horizontal force to the vehicle's chassis.

BACKGROUND OF THE INVENTION

The usage of All Terrain Vehicles (ATVs) has become ubiquitous in recent years, as new types and designs of such vehicles have appeared in the market. ATVs are employed for recreational purposes, as well as for providing swift access for emergency forces to remote, isolated locations.

Modern ATVs are normally associated with an extreme, sportive type of riding, which excludes the requirements of the more conservative populace, which exhibits a more restrained type of riding. A configurable design for a vehicle that facilitates both types of riding experiences is therefore required.

SUMMARY OF THE INVENTION

Example 1 is a dynamic joint structure (DJS) for movably connecting a wheel set of a vehicle to a chassis of the vehicle, the vehicle comprising a rear wheel set, a front wheel set, a base structure disposed between the rear and the front wheel sets and the chassis framing the base structure, the DJS may include:

an upper suspension plate having at least one upper recess with at least one upper opening;

a middle suspension plate having at least one middle recess with at least one middle opening; and at least one connector assembly comprising: a bolt, which has an elongated structure defining an insert axis "$Z_i$" along its longer side; and a restriction unit comprising an elastic element positioned around an area of the bolt, and a ring element configured and located to surround the elastic element, wherein the at least one connector assembly is configured such that the bolt is to be inserted through the at least one upper and middle openings of the upper and middle suspension plates respectively, wherein the restriction unit is configured and located such as to restrict movement of the bolt, in a plane $X_iY_i$ that is perpendicular to the insert axis $Z_i$, for translating tilt of the chassis to a pivotal movement of the bolt about the inset axis $Z_i$, for translating tilting movements of the vehicle's chassis, around a Z axis, which is perpendicular to a ground plane XY over which the vehicle is positioned, into steering movements of the wheels set to which the respective dynamic joint structure connects.

In example 2 the subject matter of example 1 may include, wherein the bolt of the restriction unit has a cylindrical section having a cylindrically symmetry around the axis $Z_i$.

In example 3 the subject matter of example 2, wherein the elastic element of the restriction unit is symmetrically arranged around the circumference of at least part of the cylindrical section of the bolt.

In example 4 the subject matter of example 1 may include, wherein the dimensions, geometry and/or size of the ring is such as to tightly engage an outer periphery of the elastic element at an inner side of the ring element, and to engage walls of the upper opening of the upper middle recess of the middle suspension plate.

In example 5 the subject matter of example 1 may include, wherein the DJS further comprises at least one elastic buffer, configured to be inserted into the recess of the middle suspension plate such as to buffer between the upper and middle suspension plates.

In example 6 the subject matter of example 5, wherein the buffer has a sloped shape changing height in respect to the insert axis $Z_i$.

Example 7 is a vehicle comprising:

a drive-control assembly comprising at least a steer element, a controller, and a steering connector connecting at one end thereof to the steering element;

a base structure comprising a chassis and a support platform, the chassis being connected to a lower end of the steering connector, wherein the chassis is further configured to frame the support platform and the support platform is configured to support thereover a load;

a front wheel set comprising two front wheels and a front connecting unit connectable to the front wheels at a first side thereof;

a rear wheel set, comprising two rear wheels and a rear connecting unit connectable to the rear wheels at a first side thereof;

one or more motors for driving the wheels, the one or more motors being controllable via the controller;

a front dynamic joint structure (DJS) configured to movably connect the front wheel set to a front side of the chassis; and a rear DJS configured to movably connect the rear wheel set to a rear side of the chassis, wherein the at least one connector assembly is configured such that the bolt is to be inserted through the at least one upper and middle openings of the upper and middle suspension plates respectively, wherein the restriction unit is configured and located such as to restrict movement of the bolt, in a plane $X_iY_i$ that is perpendicular to the insert axis $Z_i$, for translating tilt of the chassis to a pivotal movement of the bolt about the inset axis $Z_i$, for translating tilting movements of the vehicle's chassis, around a Z axis, which is perpendicular to a ground plane XY over which the vehicle is positioned, into steering movements of the wheels set to which the respective dynamic joint structure connects.

In example 8 the subject matter of example 7 may include, wherein the bolt of the restriction unit has a cylindrical section having a cylindrically symmetry around the axis $Z_i$.

In example 9 the subject matter of example 8 may include, wherein the elastic element of the restriction unit is symmetrically arranged around the circumference of at least part of the cylindrical section of the bolt.

In example 10 the subject matter of example 7 may include, wherein the dimensions, geometry and/or size of the ring of the restriction unit is such as to tightly engage an outer periphery of the elastic element at an inner side of the ring element, and to engage walls of the upper opening of the upper middle recess of the middle suspension plate.

In example 11 the subject matter of example 7 may include, wherein each of the front and/or rear dynamic joint structure further comprises at least one elastic buffer, configured to be inserted into the recess of the middle suspension plate such as to buffer between the upper and middle suspension plates.

In example 12 the subject matter of example 11 may include, wherein the buffer has a sloped shape declining in height in respect to the insert axis $Z_i$.

In example 13 the subject matter of example 7 may include, wherein each wheel is rotatable by a separate motor, each motor being separately controllable by the controller of the drive-control assembly.

Example 14 is a dynamic joint structure (DJS) for movably connecting a wheel set of a vehicle to a chassis of the vehicle, the DJS comprises:

an upper suspension plate;

a middle suspension plate; and at least one connector assembly with a restriction mechanism, the connector assembly being configured to connect the upper suspension plate to the middle suspension plate, wherein the restriction mechanism is configured

BRIEF DESCRIPTION OF THE DRAWINGS

FIGS. 9a and 9b respectively present blown, and assembled isometric views of the elastic pivot structure, according to some embodiments of the present invention.

FIG. 10 presents an exploded perspective view of the dynamic joint structure according to some embodiments of the present invention.

FIGS. 12a, 12b and 12c present a cross-section view of the upper suspension plate and associated members of the dynamic joint structure according to some embodiments of the present invention.

FIG. 18A shows the connector assembly positioned in an opening of a recess in the upper plate of the DJS; FIG. 18B shows the connector assembly threaded through an elastic sloped buffer, without showing the upper suspension plate that should be positioned therebetween; FIG. 18C shows the spherical elastic element of the restriction unit having the bolt threaded therethrough, where the elastic element is symmetrically arranged around the outer surface of a cylindrical section of the bolt; and FIG. 18D shows an elastic element of the connector assembly having a spherical ring shape or perforated bead shape.

DETAILED DESCRIPTION OF SOME EMBODIMENTS OF THE INVENTION

Figure 1:
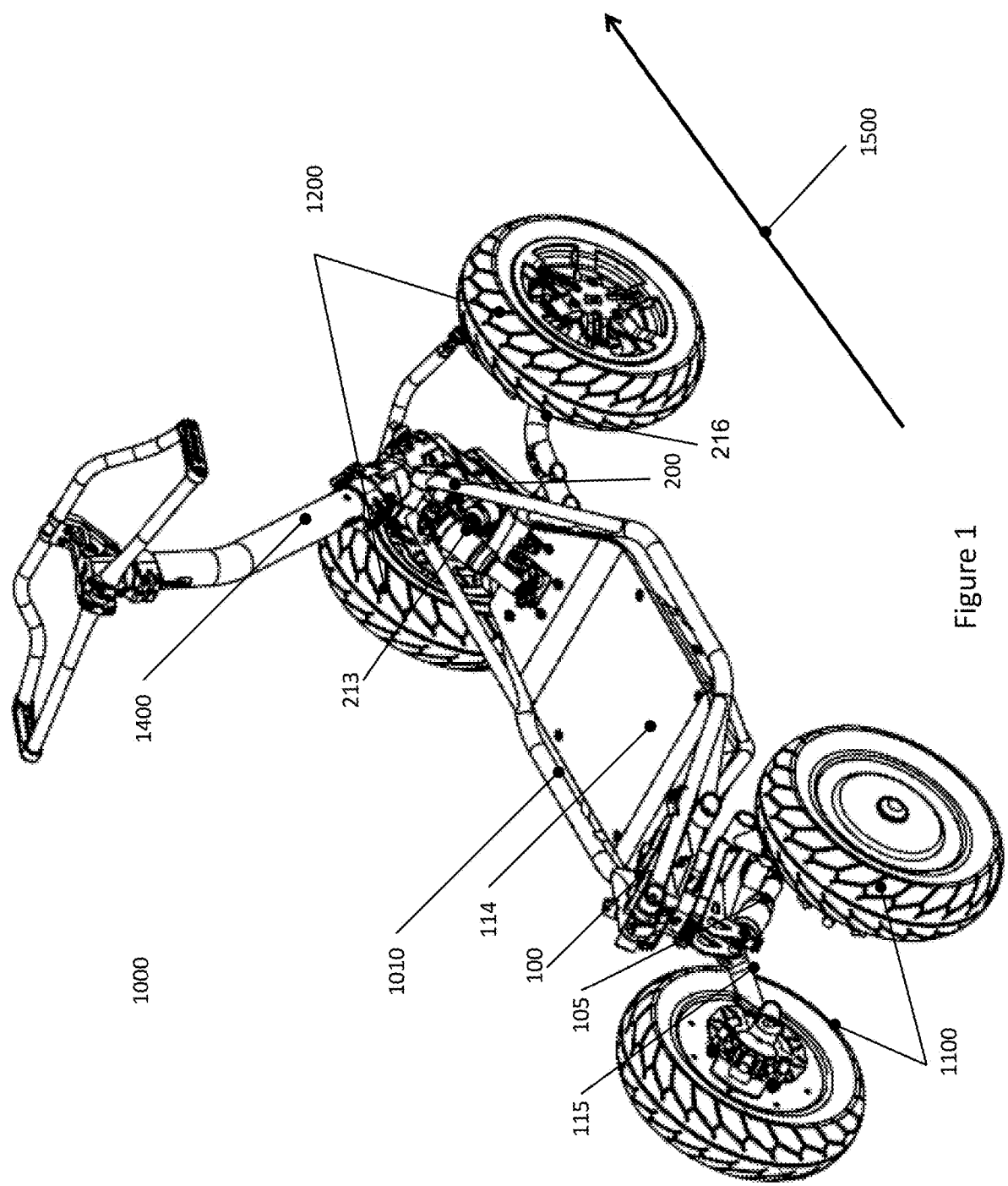
FIG. 1 presents an elevated rearward perspective view of a vehicle with a combined, rear and front steering mechanism, according to some embodiments of the present invention.

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

The term "vehicle" used herein refers to any motorized or non-motorized vehicle known in the art having two or more wheels.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

FIG. 1 presents an isometric top view of the invented vehicle 1000, according to some embodiments. The vehicle's forward direction of travel is marked by the arrow 1500. The vehicle of the present invention includes, but is not limited to at least one of the following:

- a base structure or chassis 1010;
- a substantially horizontal standing platform 114, incorporated within said chassis 1010, configured for supporting a load such as a driver, and optionally other loads or passengers;
- a front wheel set 1200 and a rear wheel set 1100, each set including one or more wheels, and an axle 115/216 attached to the said one or more wheels;
- a front dynamic joint structure 200 associated with the front wheel set 1200;
- a front shock absorber 213, associated with the front wheel set 1200;
- a rear dynamic joint structure 100 associated with the rear wheel set 1100;
- a rear shock absorber 105, associated with the rear wheel set 1100;
- a steering set comprising a steering member such as a steering handle bar 1400 movably connectable to the front wheels 1200 via one or more connecting means for steering thereof; and
- one or more motors, engines or other driving or propulsion means (not shown in FIG. 1).

Figure 2B:
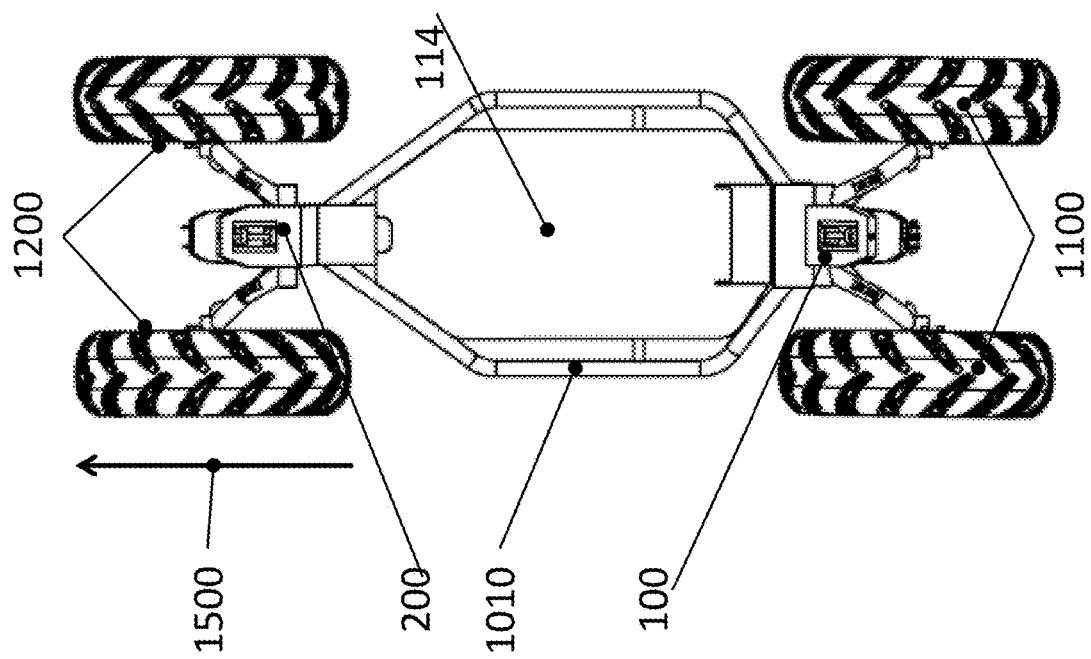
FIGS. 2A and 2B respectively show the vehicle's chassis and wheel sets in a rear and top view, excluding the steering handle bar, when no force is applied to any part of the vehicle, according to some embodiments.
Figure 2A:
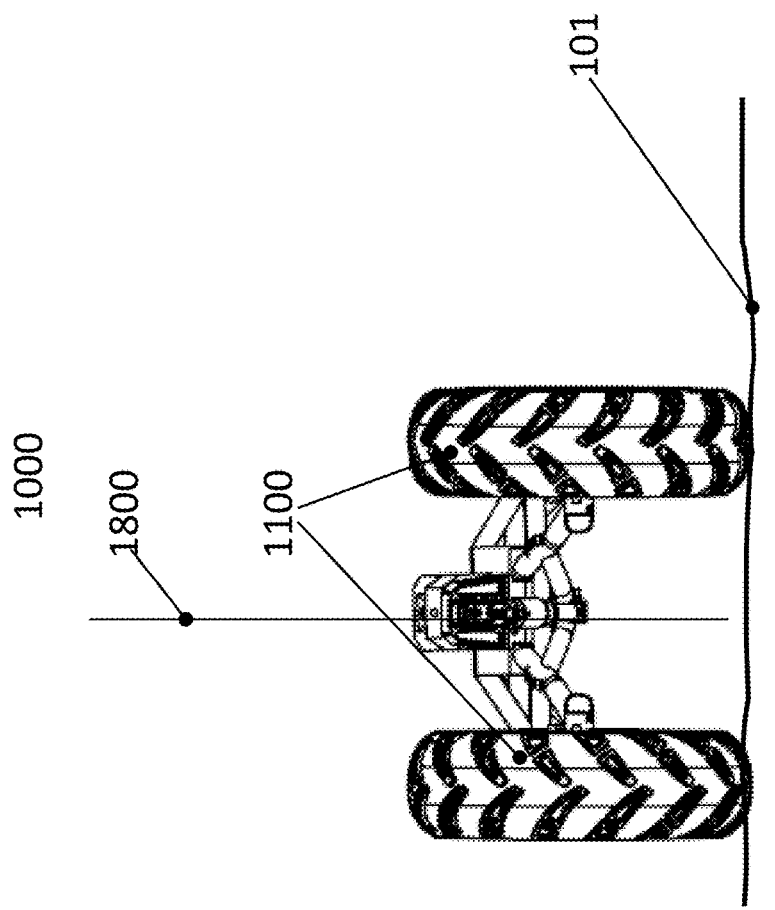

FIGS. 2A and 2B respectively show the vehicle's chassis 1010 and wheel sets 1100,1200 in a rear and top view, excluding the steering handle bar, when no force is applied to any part of the vehicle, according to some embodiments. The vehicle's forward direction of travel is marked by the arrow 1500. In this condition, both the front wheel set 1200 and rear wheel set 1100 are positioned in an orientation parallel to the direction of travel. The chassis 1010 is positioned in an upright condition, substantially parallel to the ground surface 101, and the line 1800 perpendicular to the standing platform 114 is substantially vertical. FIG. 2B also presents the locations of the front dynamic joint structure 200 and the rear dynamic joint structure 100, the functions of which are explained further below.

Figure 3:
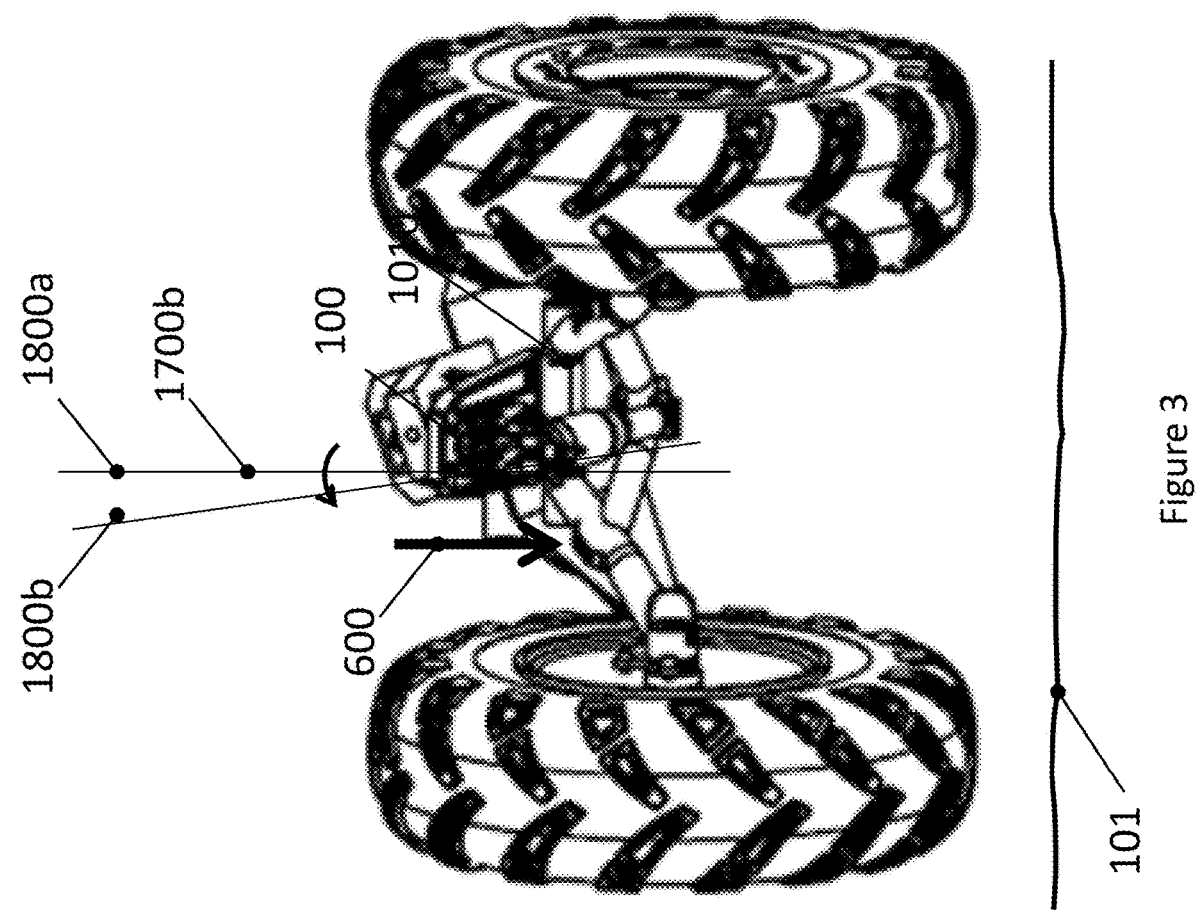
FIG. 3 presents a rear view of the vehicle in a condition at which an uneven vertical force is applied to any part of the chassis (e.g. by applying most of the driver's weight on one side of the standing platform), according to some embodiments.

FIG. 3 presents a rear view of the vehicle in a condition at which an uneven vertical force 600 is applied to any part of the chassis 1010 (e.g. by applying most of the driver's weight on one side of the standing platform 114), according to some embodiments. The said condition causes the chassis 1010 to tilt in the direction of the said uneven force: the line 1800 which is perpendicular to the vehicle's chassis 1010 is shown to have tilted 1700*b* from the vertical position 1800*a* to the tilted position 1800*b*.

Figure 4:
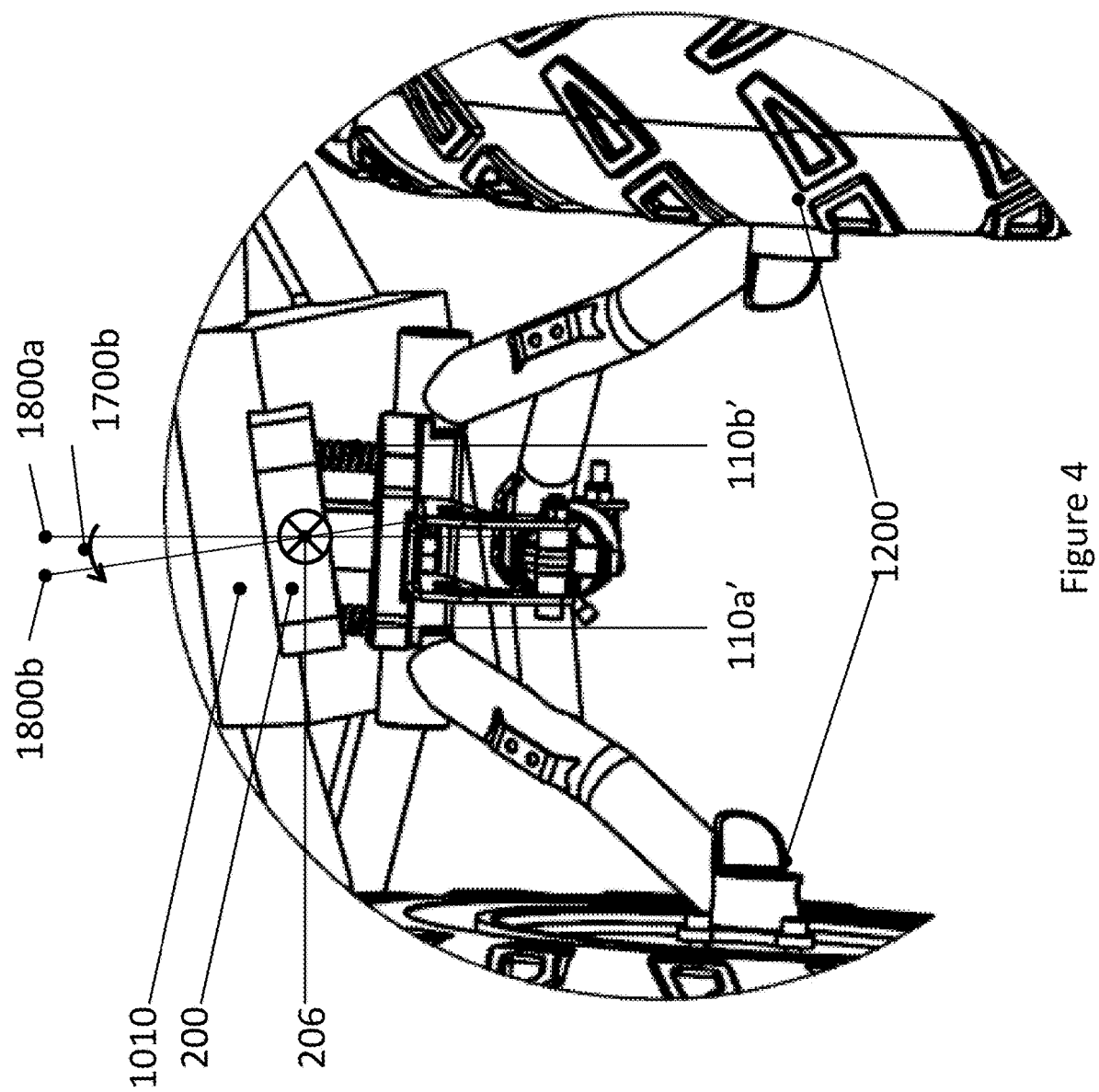
FIG. 4 presents a front elevated view of the front elastic pivot structure in a tilted configuration, according to some embodiments.

FIG. 4 presents a front elevated view of the front dynamic joint structure 200 in a tilted configuration, according to some embodiments. The line 1800*b* which is normal to the vehicle's chassis 1010 is shown to have tilted by an angle 1700*b* from the vertical position 1800*a* along a front roll axis 206.

The front dynamic joint structure 200 comprises a front set of elastic joints. In the embodiment depicted in FIG. 4, the said set of elastic joints comprises two joints 110*a'*, 110*b'*. In other embodiments, the said set of elastic joints may include any number of joints (e.g. one joint or more joints).

In the embodiment depicted in FIG. 4, the elastic joints 110*a'*, 110*b'* are implemented as spring joints. In other embodiments, the said elastic joints 110*a'*, 110*b'* are implemented as rubber joints, or pistons or any combination thereof.

The front set of elastic joints 110*a'*, 110*b'* facilitate the tilt movement of the chassis 1010 (and associated platform 114) as described above in relation to the front wheel set 1200, along the front roll axis 206. The front roll axis 206 substantially intercepts the geometric location of the front elastic joints 110*a'*, 110*b'*.

The tilt movement 1700*b* of the chassis 1010 and associated standing platform 114 around the front roll axis 206 is obtained by either one of the following mechanisms, or by a combination thereof:

The 1$^{st}$ mechanism for obtaining a tilt movement around the front roll axis 206 is based on applying an uneven vertical force 600 (e.g.: by applying most of the driver's weight to one side of the standing platform 114), as depicted in FIG. 3. In this example, the uneven vertical force 600 exerts uneven pressure on the elastic joints 110*a'*, 110*b'* of the front elastic joints' set, causing them to constrict in an uneven manner and resulting in the said tilt movement 1700*b*.

The 2$^{nd}$ mechanism for obtaining a tilt movement around the front roll axis 206 is based on applying a lateral, horizontal force to any part of the chassis 1010, and translating the chassis 1010 consequent lateral movement to a tilt motion along the front roll axis 206 by a ball joint 110n. This mechanism is further explained below, in relation to FIGS. 12a, 12b, 12c.

The tilting 1700b of the chassis 1010 around the front roll axis 109 is translated by the front dynamic joint structure 200 to a yaw motion of the front wheel set 1200, causing the vehicle to steer in response to the tilt. The said translation of the chassis 1010 tilt to the wheel set's yaw motion is explained further below, in relation to FIG. 16.

Figure 5:
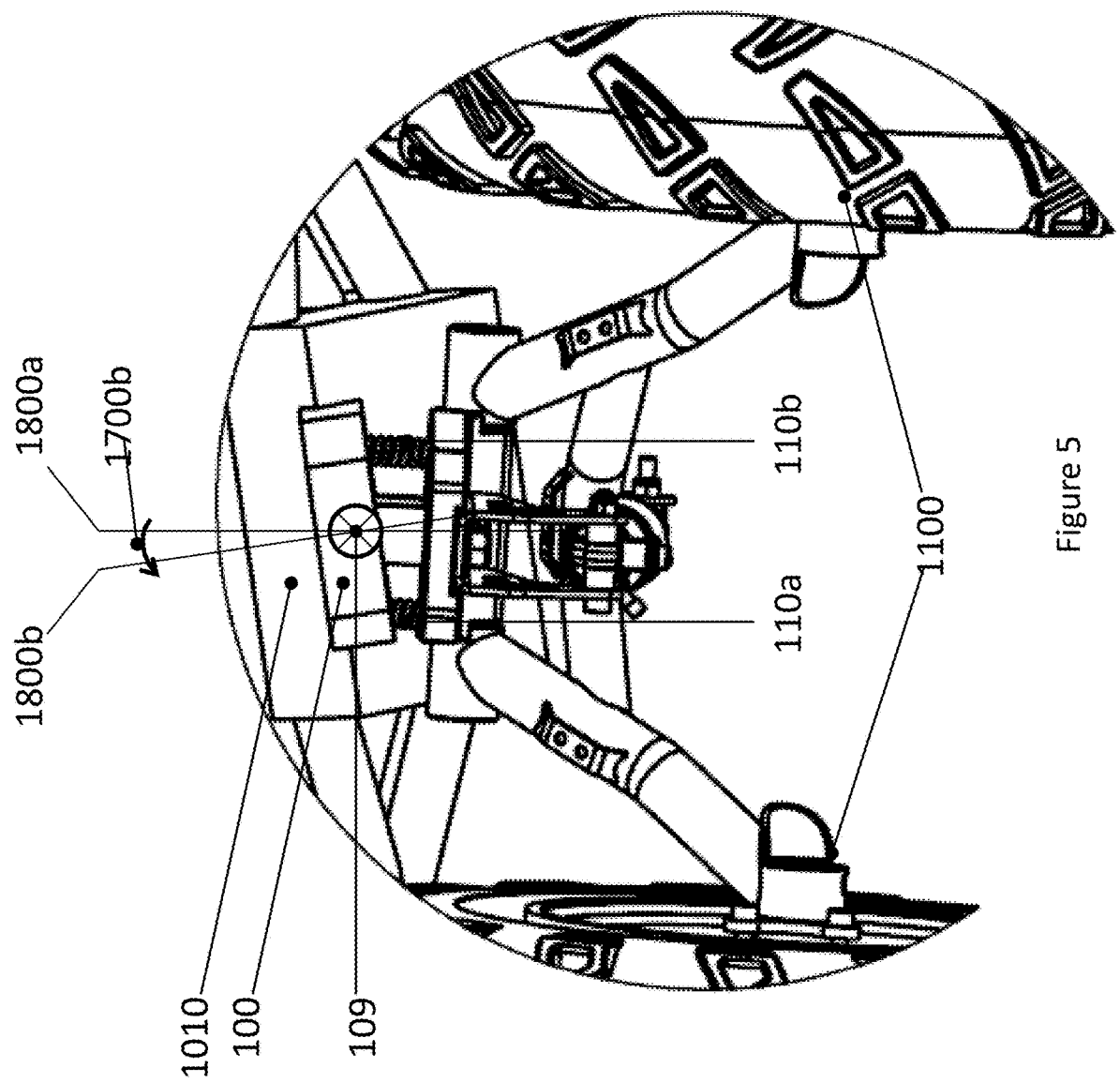
FIG. 5 presents a rear, elevated view of the rear elastic pivot structure in a tilted position, according to some embodiments.

FIG. 5 presents a rear, elevated view of the rear pivot joint structure 100 in a tilted position, according to some embodiments. The line 1800b which is normal to the vehicle's chassis 1010 is shown to have tilted by an angle 1700b from the vertical position 1800a along a rear roll axis 109.

The rear dynamic joint structure 100 comprises a rear set of elastic joints. In the embodiment depicted in FIG. 5, the said set of elastic joints comprises two joints 110a, 110b. In other embodiments, the said set of elastic joints may include any number of joints (e.g. one joint or more joints).

In the embodiment depicted in FIG. 5, the elastic joints 110a, 110b are implemented as spring joints. In other embodiments, the said elastic joints 110a, 110b are implemented as rubber joints or pistons or any combination thereof.

The rear set of elastic joints 110a, 110b facilitate a tilt movement of the chassis 1010 (and associated platform 114) in relation to the rear wheel set 1100, along the rear roll axis 109. The rear roll axis 109 substantially intercepts the geometric location of the rear elastic joints 110a, 110b.

The tilt movement 1700b of the chassis 1010 and associated standing platform 114 around the rear roll axis 109 is obtained by either one of the following mechanisms, or by a combination thereof:

The $1^{st}$ mechanism for obtaining tilt around the rear roll axis 109 is based on applying an uneven vertical force 600 to any part of the chassis 1010 (e.g. by applying most of the driver's weight to one side of the standing platform 114). The said uneven vertical force 600 exerts uneven pressure on the elastic joints 110a, 110b of the rear dynamic joint structure 100. The elastic joints are constricted in an uneven manner, resulting in the said tilting motion 1700b.

The $2^{nd}$ mechanism for obtaining a tilt movement around the rear roll axis 109 is based on applying a lateral, horizontal force to any part of the chassis 1000, and translating the chassis 1010 consequent lateral movement to a tilt motion along the rear roll axis 109 by a ball joint. This mechanism is further explained below, in relation to FIGS. 12a, 12b, 12c.

The $3^{rd}$ mechanism for obtaining a tilt movement around the rear roll axis 109 is also based on applying a lateral, horizontal force to any part of the chassis 1010. A force moment comprised of the said lateral force, and the ground's reactive force produces a yaw motion of the rear wheel set, as well as a tilt of the chassis 1010. The function of this mechanism is explained in detail in relation to FIG. 14.

The tilting 1700b of the chassis 1010 around the rear roll axis 109 is translated by the rear dynamic joint structure 100 to a yaw motion of the rear wheel set, causing the vehicle to steer in the direction of the tilt. The said translation of the chassis 1010 tilt to the wheel's yaw motion is explained further below, in relation to FIG. 14.

Figure 6:
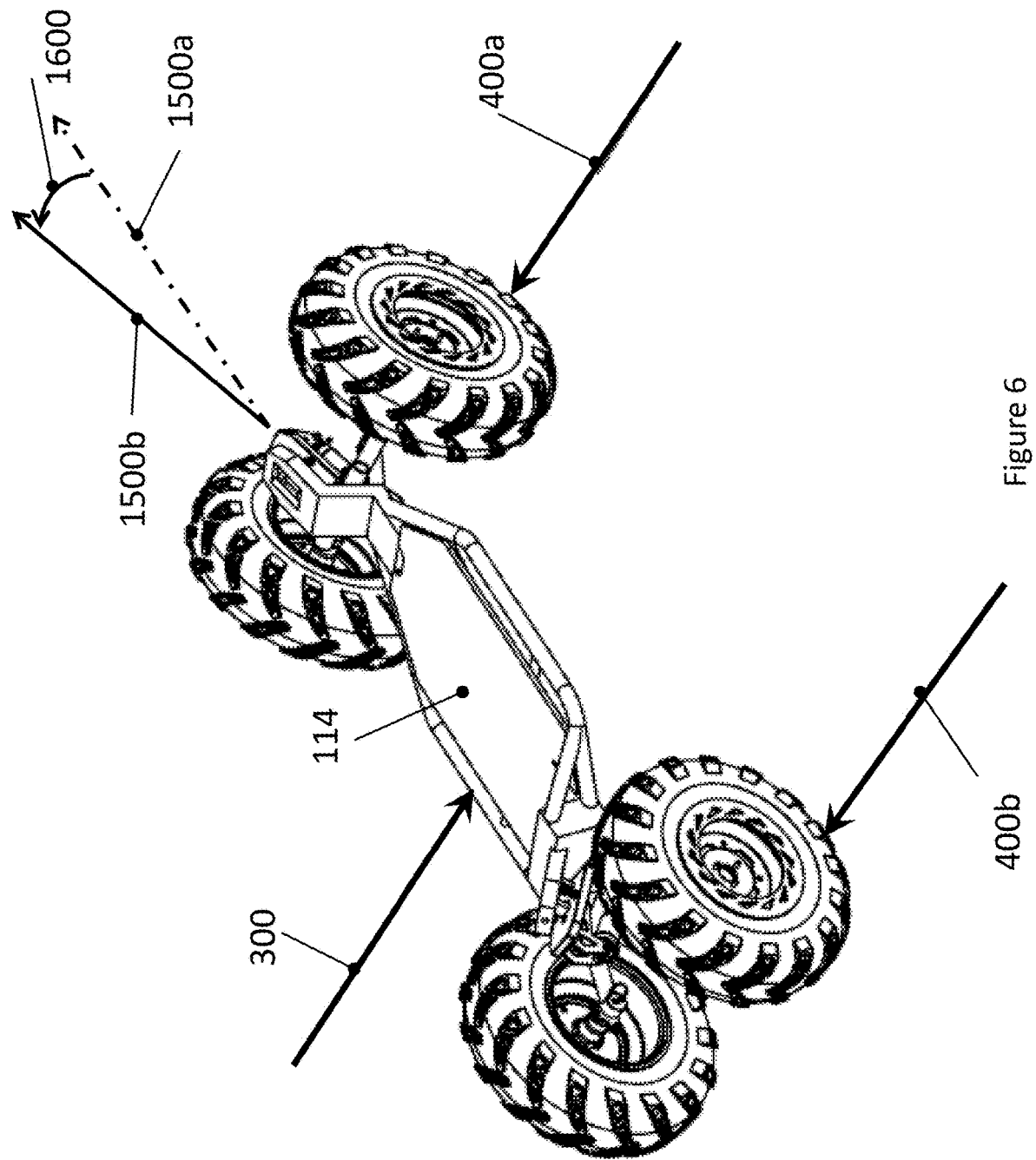
FIGS. 6 and 7 respectively show an elevated isometric view and a top view of the vehicle chassis and wheels, during the application of a lateral, horizontal force to the chassis and the associated standing platform according to some embodiments.
Figure 7:
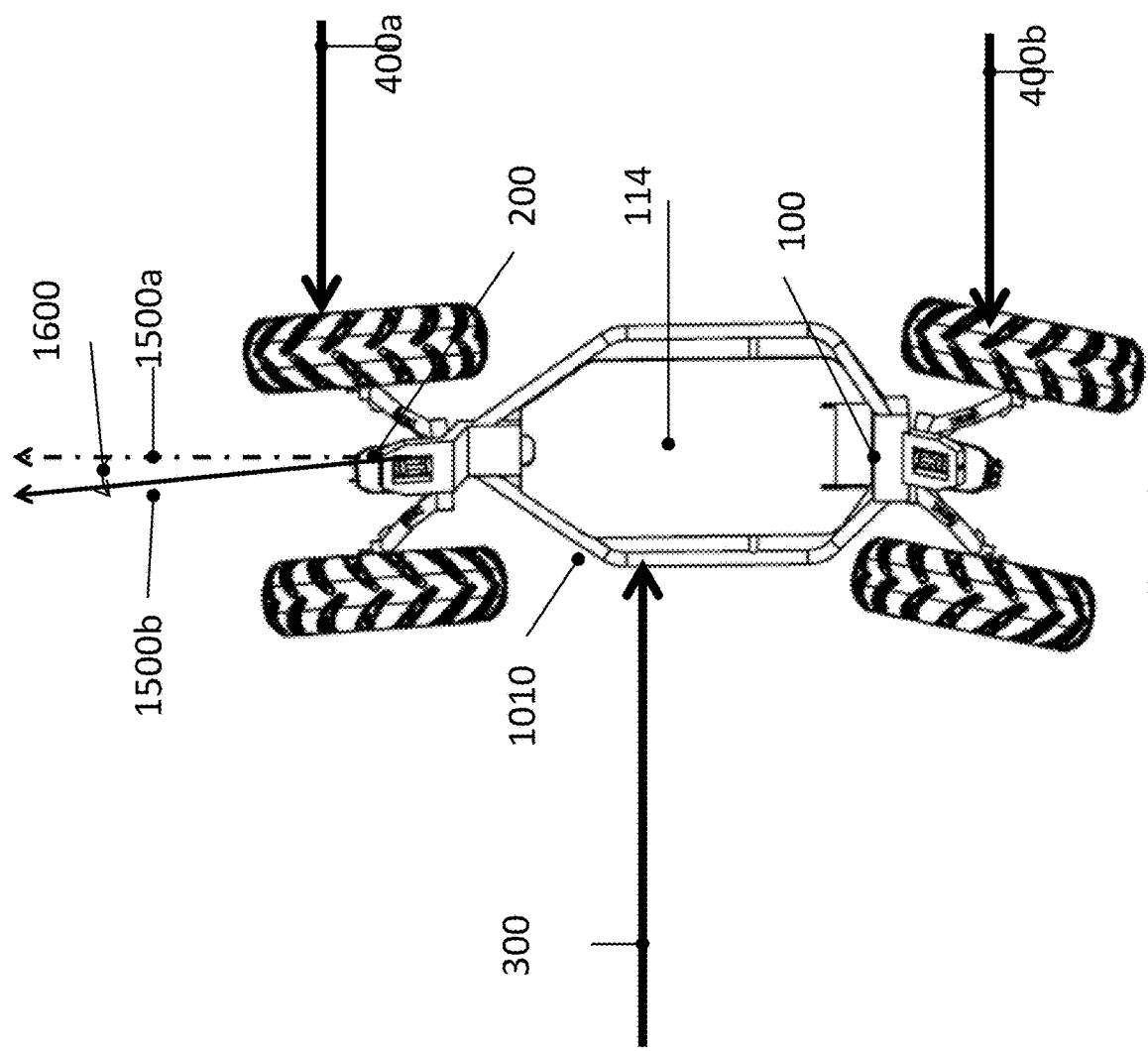

FIGS. 6 and 7 respectively show an elevated isometric view and a top view of the vehicle chassis 1010 and wheels, during the application of a lateral, horizontal force 300 to the chassis 1010 (and the associated standing platform 114) according to some embodiments. The said lateral force 300 may be applied in various conditions, including for example:
- shifting the driver's weight laterally to one side of the standing platform 114, as in a surfing motion;
- directly applying a lateral horizontal vector of force to any part of the vehicle's chassis 1010; and
- steering the vehicle in a curved route by using the steering handle bar 1400, thus generating a lateral centrifugal force.

The application of the said lateral force 300 creates reactive friction forces 400a and 400b, originating from the ground and applied to the front 1200 and rear 1100 wheel sets respectively. The action line of the ground's reactive force 400b passes through the wheel's point of contact with the ground.

The combination of force vectors 300 and 400a creates a force moment on the front wheel set 1200. The combination of force vectors 300 and 400b creates a force moment on the rear wheel set 1100. The said force moments cause the front and rear wheel sets to yaw. This yaw movement steers the vehicle against the direction of the applied horizontal lateral force 300, and changes the direction of the vehicle travel from 1500a to 1500b. The said yaw movement provides the following benefits to the invented vehicle:
- The driver may enhance the steering of the vehicle through lateral shifting of his/her weight, in a similar manner to a surfing motion; and
- The vehicle produces enhanced steering when turning in sharp curves.

Figure 8:
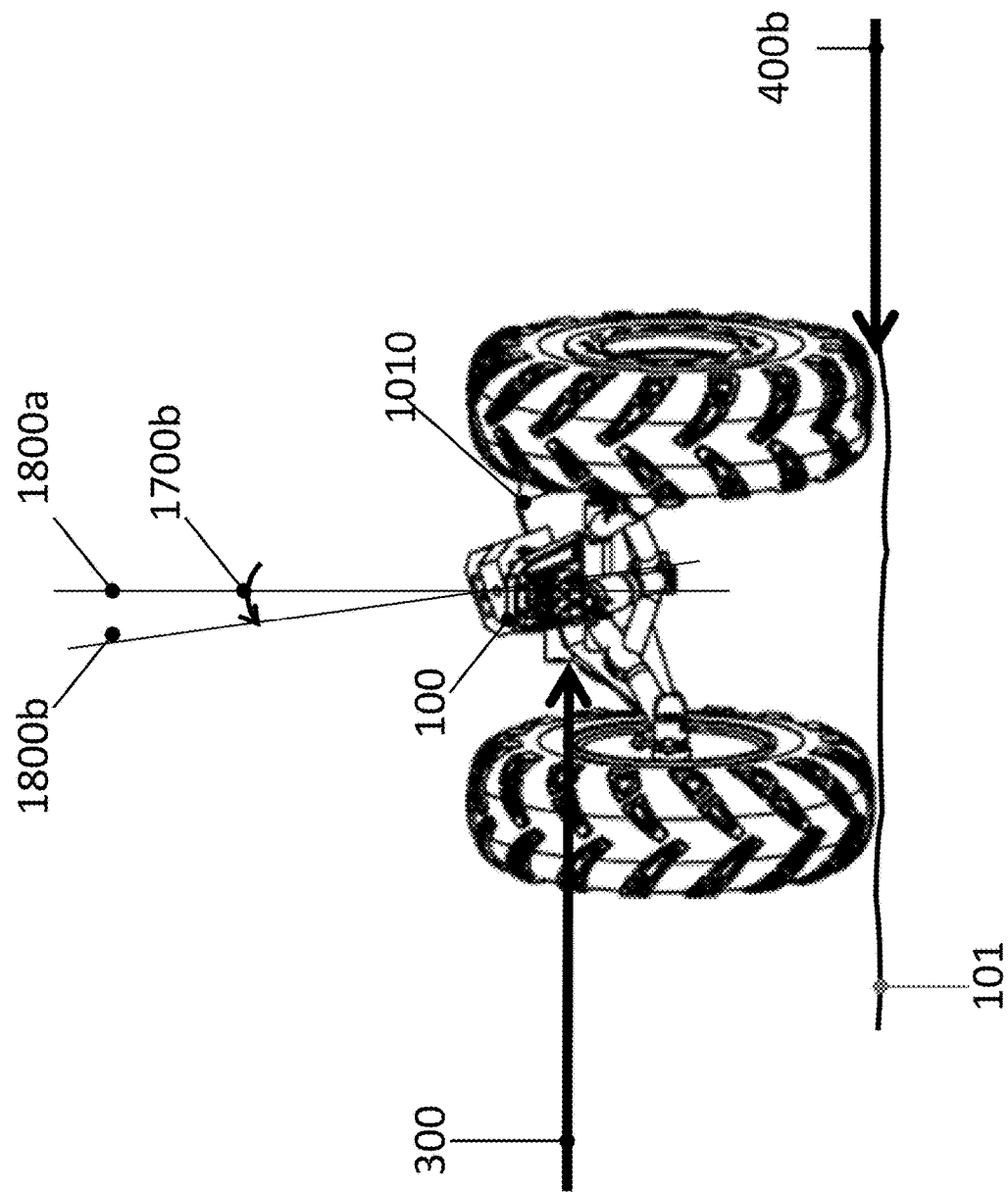
FIG. 8 presents a rear view of the vehicle chassis and wheels, during the application of a lateral, horizontal force to the chassis, according to some embodiments of the present invention.

FIG. 8 presents a rear view of the vehicle chassis 1010 and wheels, during the application of a lateral, horizontal force 300 to the chassis 1010, according to some embodiments of the present invention. Note that the application of the said horizontal force 300 causes the chassis 1010 to tilt 1700b.

The rear dynamic joint structure 100 and front dynamic joint structure 200 react to the application of a horizontal, lateral force 300 and to the ground's reactive forces 400b, 400a by tilting the chassis 1010, along the rear roll axis 109 and front role axis 206 respectively. The mechanisms by which the dynamic joint structures do so are explained further below.

FIGS. 9a and 9b respectively present blown, and assembled isometric views of the dynamic joint structures 100, 200, according to some embodiments of the present invention. The structure of the front dynamic joint structure 200 is identical to that of the rear dynamic joint structure 100, and they will not be elaborated separately for the purpose of brevity.

The numbering of the front pivot structure 200 members is marked by a tag, i.e.: 110X annotates a member of the rear dynamic joint structure 100, whereas 110X' annotates a member of the front dynamic joint structure 200.

According to some embodiments, the dynamic joint structure 100, 200 comprises an upper suspension plate 110f, and a middle suspension plate 110e. Said plates 110f, 110e are attached via one or more elastic joints 110a, 110b. This structure enables the plates 110f', 110e' of the front dynamic joint structure 200 to tilt in respect to each other along the front roll axis 206, and enables the plates 110f, 110e of the rear dynamic joint structure 100 to tilt in respect to each other along the rear roll axis 109 (see FIGS. 4, 5). This facilitates a tilt of the chassis 1010 in respect to the front wheel set 1200 along the front roll axis 206, and a tilt of the chassis 1010 in respect to the rear wheel set 1100 along the rear roll axis 206.

The elastic joints 110a', 110b', 110c', 110d' facilitate the tilt of the chassis 1010 in respect to the front wheel set 1200 along the front roll axis 206, as explained in relation to FIG. 4.

The elastic joints 110a, 110b, 110c, 110d facilitate the tilt of the chassis 1010 in respect to the rear wheel set 1100 along the rear roll axis 109, as explained in relation to FIG. 5.

According to the embodiment depicted in FIGS. 9a and 9b, the middle suspension plate 110e incorporates housings 110p, configured to hold a set of two elastic rubber joints 110a, 110b. The said set of rubber joints 110a, 110b is secured between the middle suspension plate 110e and the upper suspension plate 110f by a set of bolts 110k.

According to other embodiments (e.g. as depicted in FIG. 5), the said elastic joints 110a, 110b are implemented as springs or pistons or any combination thereof.

According to the embodiment depicted in FIG. 9a, the upper suspension plate 110f comprises additional housings 110q, holding a second set of elastic rubber joints 110c, 110d. The said second set of elastic rubber joints 110c, 110d is secured above the upper suspension plate 110f by the same set of bolts 110k, between the upper suspension plate 110f and a set of tighteners 1101.

According to other embodiments (e.g. as depicted in FIG. 5) the said second set of elastic rubber joints 110c, 110d is not installed.

The chassis 1010 is attached to the upper suspension plate 110f of the dynamic joint structure 100, 200. According to the embodiment depicted in FIG. 9a, the chassis 1010 is attached to the upper suspension plate 110f in at least two positions:
  through a bolt in position 110m of the upper suspension plate 110f; and
  through a bolt in position 110g of a connector module, which is connected to the upper suspension plate 110f by an additional set of bolts 110h.

According to other embodiments, the chassis 1010 incorporates the upper suspension plate 110f, and is directly attached to the said elastic joints 110a, 110b, 110c, 110d.

According to the embodiment depicted in FIG. 9a, the middle suspension plate 110e is connected to the rear wheel set 1100 and rear shock absorber 105 as follows:
  the rear axle 115 (not shown) is connected to the middle suspension plate 110e through a bolt in position 110r;
  a lower suspension connector 110i is connected to the middle suspension plate 110e on its upper side; and
  said lower suspension connector 110i is connected to the rear shock absorber (not shown) by a set of bolts in position 110j on its bottom side.

According to other embodiments, the middle suspension plate 110e is connected to the rear wheel set 1100 and rear shock absorber 105 directly, i.e. not via a lower suspension connector 110i.

According to the embodiment depicted in FIG. 9a, the middle suspension plate 110e' is connected to the front wheel set 1200 and front shock absorber 213 as follows:
  the front axle 216 (not shown) is connected to the middle suspension plate 110e' through a bolt in position 110r';
  a lower suspension connector 110i' is connected to the middle suspension plate 110e' on its upper side; and
  said lower suspension connector 110i' is connected to the front shock absorber (not shown) by a set of bolts in position 110j' on its bottom side.

According to other embodiments, the middle suspension plate 110e' is connected to the front wheel set 1200 and front shock absorber 213 directly, i.e. not via a lower suspension connector 110i'.

According to some embodiments, the elastic joints 110a, 110b, 110c, 110d, 110a', 110b', 110c', 110d' are configured to be replaceable, and are configured to exhibit various levels of elasticity. These features of the elastic joints facilitate the ability to modify the vehicle's compliance to the tilt motion in response to the application of vertical and horizontal forces, and customize the vehicle according to the requirements of specific drivers. For example:
  Rigid elastic joints 110a, 110b, 110c, 110d, 110a', 110b', 110c', 110d' will be less compliant to the tilting motion, and will induce a moderate riding experience, characteristic of conservative drivers.
  Softer elastic joints 110a, 110b, 110c, 110d, 110a', 110b', 110c', 110d' will be more compliant to the tilting motion, and will induce an extreme riding experience, characteristic of sportive drivers.

As mentioned above, one of the mechanisms for tilting the chassis 1010 around the rear and front roll axes 109, 206 is based on applying a lateral force in a horizontal vector 300 to any part of the chassis 1010, and translating the chassis 1010 lateral movement to a tilt movement along the rear and/or front roll axis 109, 206 by a ball joint.

Reference is now made to FIG. 10, presenting an exploded perspective view of the dynamic joint structure 100, 200 according to another embodiment of the present invention. This figure is substantially equivalent to that of FIG. 9a, with the addition of a pair of ball joint connectors 110n, attached to the upper suspension plate 110f within the housing 110q, and securing the bolts 110k into place.

According to some embodiments, the said housings 110q of the upper suspension plate 110f comprise a grooved opening 110s, enabling the bolt 110k to move laterally in respect to the upper suspension plate 110f.

Figure 11B:
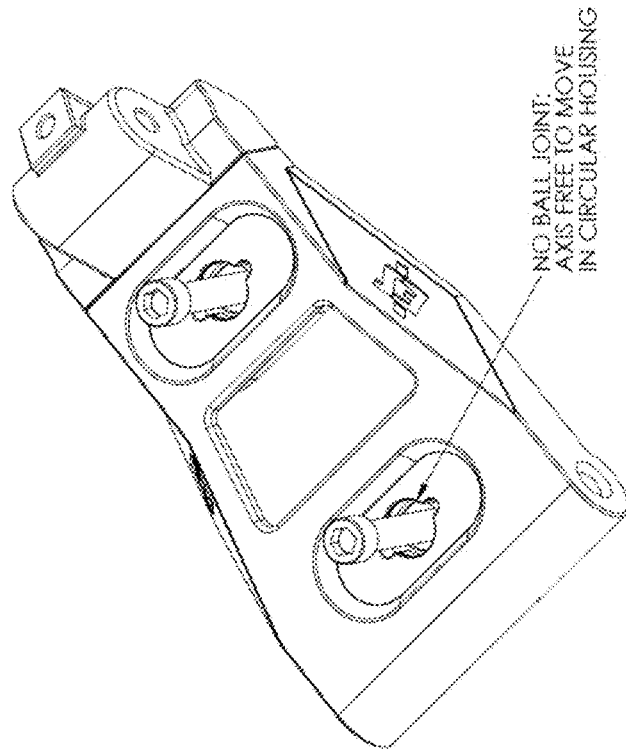
FIGS. 11a and 11b present an assembled isometric view of the dynamic joint structure, with and without the installation of the ball joint connector respectively, according to some embodiments
Figure 11A:
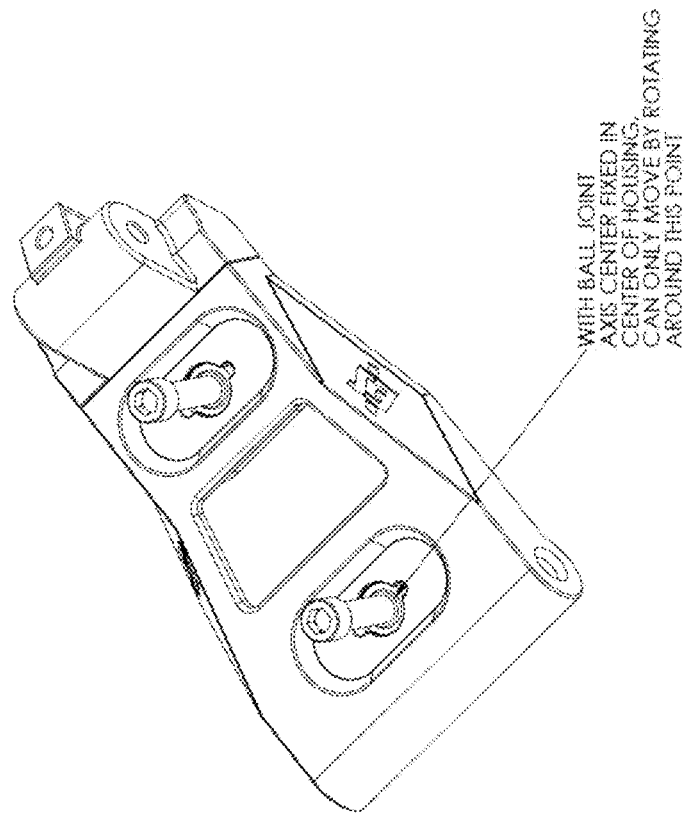

FIGS. 11a and 11b present an assembled isometric view of the dynamic joint structure 100, 200, with and without the installation of the ball joint connector 110n respectively, according to some embodiments.

In FIG. 11b, the bolt 110k is free to move along the grooved opening 110s within the elastic joint's 14 oval housing 110q. This enables the upper suspension plate 110f to move laterally in respect to the middle suspension plate 110e, and hence enables the chassis 1010 to move laterally in respect to the rear wheel set 1100.

In FIG. 11a, the ball joint's axis is fixed in the center of the elastic joint's housing 110q by the ball joint 110n. Consequently, the bolt 110k can only move by rotating around that point. This limitation translates a lateral movement of the upper suspension plate 110f to a tilt movement in respect to the middle suspension plate 110e.

On the front end of the vehicle, the said translation of a lateral movement of the upper suspension plate 110f to a tilt movement in respect to the middle suspension plate 110e', results in a tilt of the chassis 1010 in respect to the front wheel set 1200 along the front roll axis 206. In turn, this tilt intensifies the vehicle's front wheel steering in response to an applied lateral, horizontal force 300, as explained further below.

On the rear end of the vehicle, the said translation of a lateral movement of the upper suspension plate 110f to a tilt movement in respect to the middle suspension plate 110e, results in a tilt of the chassis 1010 in respect to the rear wheel set 1100 along the rear roll axis 109. In turn, this tilt intensifies the vehicle's rear wheel steering in response to an applied lateral, horizontal force 300, as explained further below.

According to some embodiments, the front dynamic joint structure 200 may be configured to have both ball joints 110n' installed, or only one ball joint 110n' installed, or none of the ball joints 110n' installed, according to the required riding experience, wherein each added ball joint 110n' intensifies the vehicle's front wheel steering in response to an applied lateral, horizontal force 300.

According to some embodiments, the rear dynamic joint structure 100 may be configured to have both ball joints 110n installed, or only one ball joint 110n installed, or none of the ball joints 110n installed, according to the required riding experience, wherein each added ball joint 110n intensifies the vehicle's rear wheel steering in response to an applied lateral, horizontal force 300.

FIGS. 12a, 12b and 12c present a cross-section view of the upper suspension plate 110f and associated members of the pivot structure 100, 200 according to some embodiments of the present invention. Note that the numbering in the following description relates to the rear dynamic joint structure 100 for the purpose of brevity, but this should not be considered limiting, as the disclosed mechanism is substantially identical in regards to the operation of the front dynamic joint structure 200.

In FIGS. 12a and 12c a lateral, horizontal force 300 is exerted via the chassis 1010 to the upper suspension plate 110f. The ground exerts a reactive force 400a/400b on the middle suspension plate 110e via the rear wheels in response to the said horizontal force vector 300.

FIG. 12b presents the position of the upper suspension plate 110f with the ball joint 110n assembled, when no forces are applied.

FIG. 12a presents the effect of the said combined lateral horizontal force 300 and ground reactive force 400a/400b, in the absence of the ball joint 110n. The upper suspension plate 110f is shown to have shifted to the left in relation to the middle suspension plate 110e in response to the combination of forces 300 and 400a/400b.

FIG. 12c presents the effect of the combined lateral horizontal force 300 and ground reactive force 400a/400b, when the ball joint is assembled. The upper suspension plate 110f is shown to have tilted around the position of the ball joint 110n in relation to the middle suspension plate 110e, in response to the combination of said forces 300 and 400a/400b.

The action line of force vector 300 is substantially parallel to, and above the horizontal level of the ball joint's position 110n-h. The action line of force vector 400a/400b is substantially parallel to, and below the horizontal level of the ball joint's position 110n-h. In the absence of the ball joint, as presented in FIG. 12a, the bolt 110k is free to slide horizontally along the elongated oval groove 100s in response to the said combination of horizontal lateral force 300 and reactive force 400a/400b. When the ball joint is assembled, as presented in FIG. 12c, the combination of the horizontal force 300 and the ground's reactive force 400a/400b exerts a force moment on the upper suspension plate 110f via the ball joint 110n. This moment forces the ball joint 110n to translate the upper suspension plate's 110f horizontal movement to a tilt motion along the roll axis 109/206. The chassis 1010 (not shown here), which is connected to the upper suspension plate 110f through bolt 110m and bolt 110g (see FIG. 9a) will exhibit the same tilt motion along the roll axis 109/206.

Figure 13:
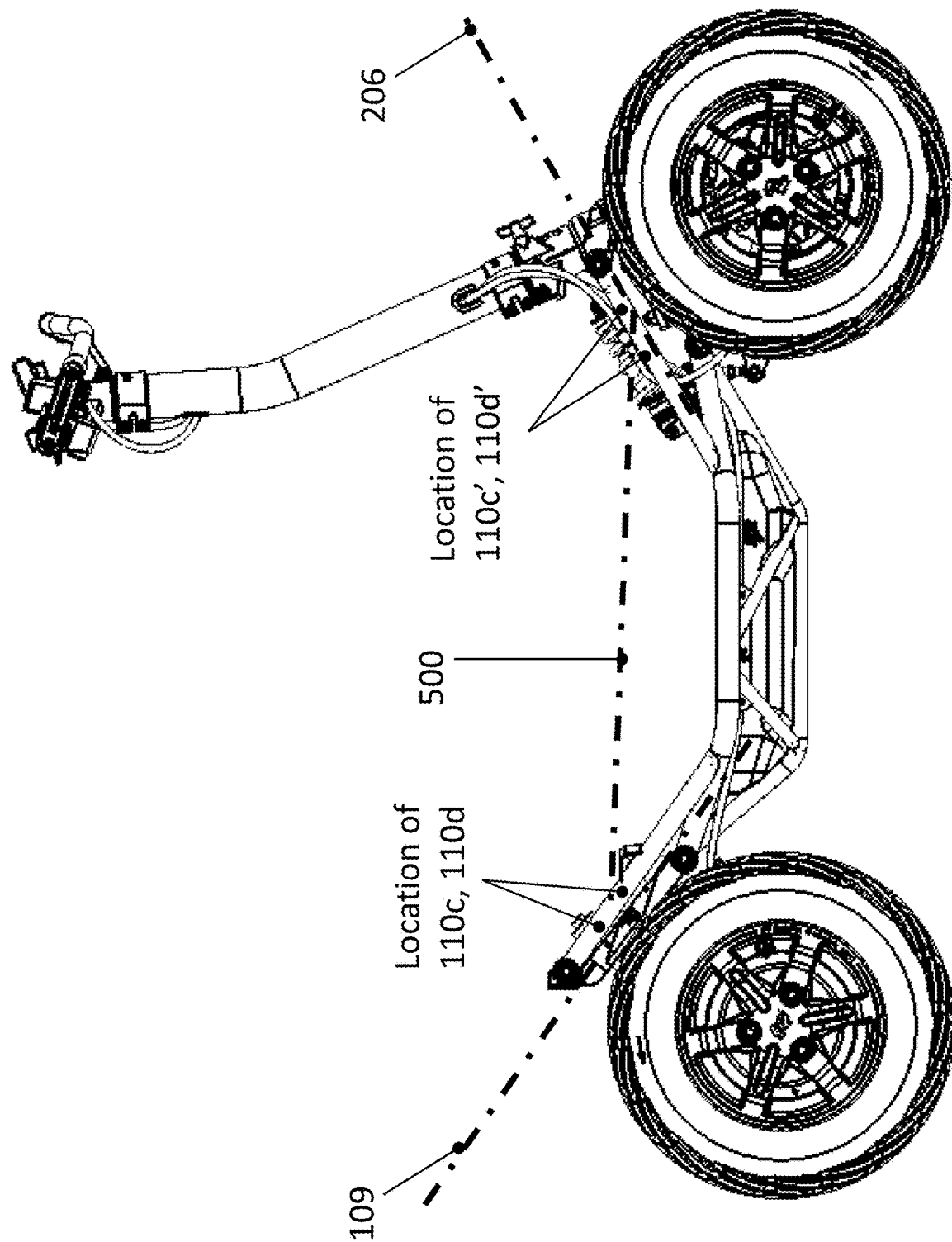
FIG. 13 presents a lateral view of the invented vehicle, depicting the location of the front roll axis and the rear roll axis, according to some embodiments of the present invention.

FIG. 13, presents a lateral view of the invented vehicle, depicting the location of the front roll axis 206 and the rear roll axis 109, according to some embodiments of the present invention. When the chassis 1010 is tilted by any of the mechanisms described above (e.g. by applying a vertical force on the standing platform 114, or by applying a lateral, horizontal force that is translated to a tilt movement), it exhibits an equivalent tilt movement along the front roll axis 206 and along the rear roll axis 109.

The combined roll movement of the chassis around said front and rear roll axes forms a swing movement, along a swing axis 500. Said swing axis is formed by the imaginary line connecting the front pivot structure 200 and rear dynamic joint structure 100, and is substantially horizontal.

The invented vehicle displays enhanced rear and front wheel steering capabilities, originating from its inherently instable characteristics. For example:

Tilting the standing platform 114, by applying an uneven vertical force on the standing platform 114 produces a yaw of the front wheel set 1200 and the rear wheel set 1100, as explained below in relation to FIGS. 14 and 16;

The said yaw steers the vehicle in response to the applied vertical force; and

The centrifugal, lateral force induced by the said steering is translated by the ball joints 110n, 110n' located within the dynamic joint structures 100, 200 to additional tilt motion, further amplifying the initial tilt.

The present invention makes use of a pendulum effect to enhance the vehicle's dynamic stability during steering. The said pendulum operates in the following manner:

The swing axis 500 is elevated in respect to the standing platform 114, which normally carries the weight of at least one driver.

When the vehicle is in a neutral state (i.e. the driver is standing upright, and the vehicle is directed forward), the weight exerted on the standing platform 114 acts as a pendulum, swinging around the swing axis 500.

After steering the vehicle in a curved route, the driver may make use of the said pendulum effect to restore the standing platform 114 to an upright position, as portrayed in FIG. 2A. This enables the driver to swiftly bring the vehicle back to a state of dynamic stability, following sharp turn maneuvers.

Figure 14:
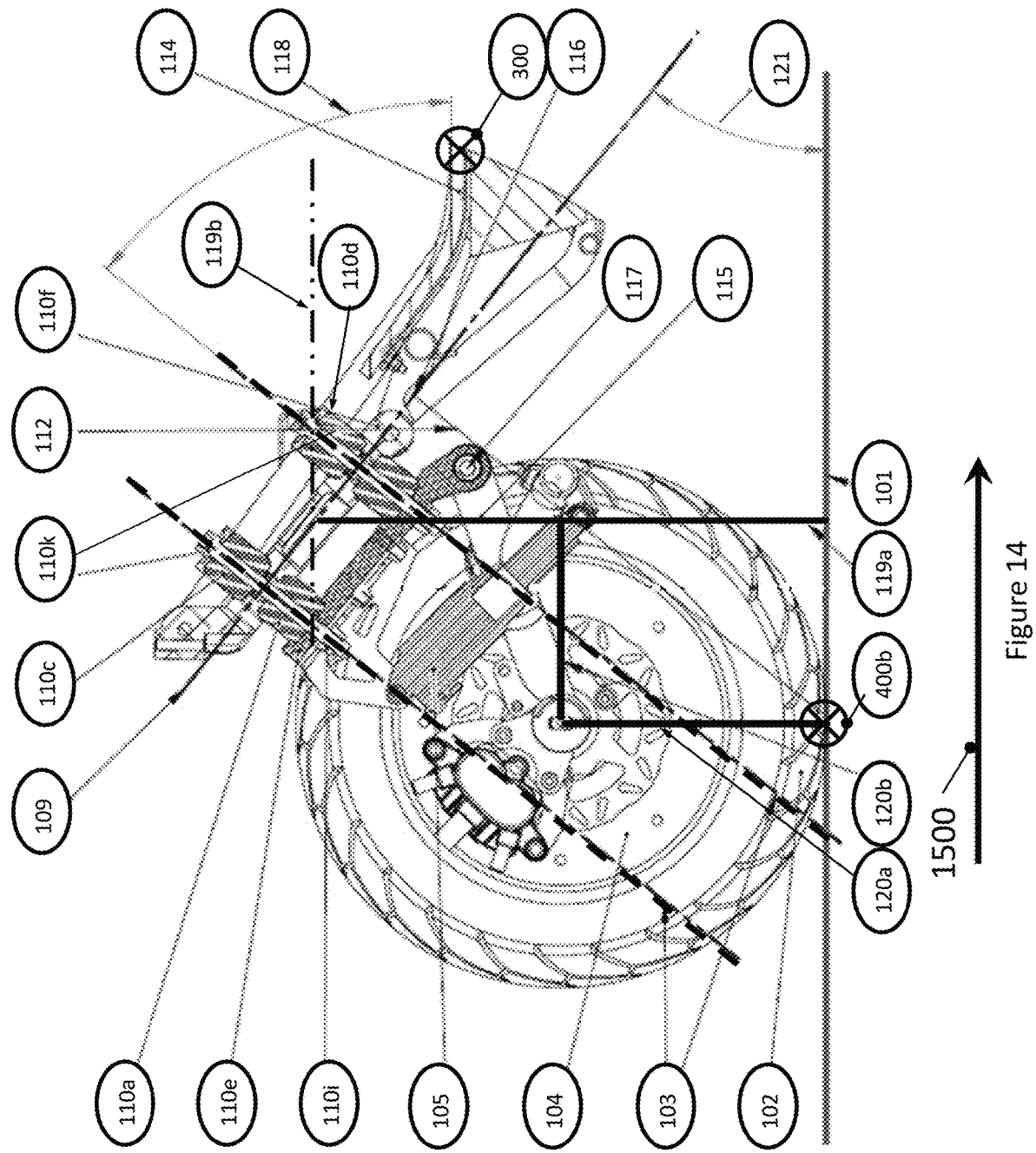
FIG. 14 presents a detailed lateral section view of the rear end of the vehicle according to some embodiments.

FIG. 14 presents a detailed lateral section view of the rear end of the vehicle according to some embodiments. In this figure, the proximal wheel parts have been removed to provide a clear view of the structure.

The present invention makes use of several mechanisms for producing an enhanced rear-wheel steering experience. It is important to note the following structural properties depicted in FIG. 14, in order to understand the said different mechanisms for enhanced rear-wheel steering:

The rear wheel set 1100 is not explicitly marked in FIG. 14. It comprises at least part of: the tires 102, wheel disks 103 and wheel hubs 104.

The vehicle's standing platform 114 is angled upwards 121, towards the end of the vehicle, parallel to the rear roll axis 109. Angle 118 complements angle 121 to 90 degrees (i.e. angle 118=90°−angle 121).

Distance vector 112 is the vector perpendicular to the roll axis 109, intercepting the wheel's point of contact with the ground.

Line 120A is substantially perpendicular to the ground. It intercepts the wheel's contact point with the ground, marking the position through which the ground's reactive force's action line passes.

The angled structure 121 displaces the midpoint of the rear wheels from beneath the elastic joints set 110a, 110b, 110c, 110d to an extended position towards the rear of the vehicle, and elongates the distance vector 112.

Lines 119a and 119b respectively mark the vertical and horizontal vector components of the rear roll axis 109.

Vertical line 119a is substantially perpendicular to the ground, and intercepts the rear roll axis 109. This line marks the axis along which the rear wheel set yaws according to the mechanisms explained in the following paragraphs.

According to the embodiment depicted in FIG. 14, wherein the dynamic joint structure comprises two pairs of elastic joints (110a, 110c and 110b, 110d), the vertical line 119a intercepts the rear roll axis 109 at substantially the midpoint between the two bolts 110k, i.e. between elastic joints pairs 110a, 110c and 110b, 110d.

According to other embodiments, wherein the dynamic joint structure only comprises a single pair of elastic joints (110a, 110b, see FIG. 5), the vertical line 119a intercepts the rear roll axis 109 at the location of the single pair of joints 110a, 110b.

Horizontal line 120b is marks the rear wheels' yaw force moment's distance vector. Its length spreads the horizontal distance between vertical line 119a and the wheel's contact point with the ground. This distance vector is elongated as the angle 121 is increased (and angle 118 is decreased).

The $1^{st}$ said mechanism for enhanced rear wheel steering is based on applying a lateral, horizontal force 300 on the chassis 1010. Such a force 300 may be applied, for example by laterally swaying the driver's weight as in a surfing motion, or by steering the vehicle in a sharp turn (e.g. by using the steering handle) and thus producing a lateral centrifugal force.

The ground 101 reacts to the applied lateral force 300 by a reactive, friction force 400b (see FIG. 7), originating from the wheel's point of contact with the ground (interception of line 120a with the ground 101).

The combination of the applied, lateral, horizontal force 300 and the ground's reaction force 400b produces a force moment, acting along distance vector 120b. This force moment causes the rear wheel set 1100 to yaw along the vertical line 119a, and heightens the vehicle's rear wheel steering in response to an applied lateral, horizontal force 300. The elongation of distance vector 120b by the angle 121 increases the force moment applied by the ground's reaction force 400b, and amplifies the said yaw motion.

The $2^{nd}$ said mechanism for enhanced rear wheel steering is also based on applying a lateral, horizontal force 300 on the chassis 1010. The combination of the applied, lateral, horizontal force 300 and the ground's reaction force 400b produces a force moment, acting along the vertical line 119a. This force moment causes the rear wheel set 1100 to tilt along horizontal line 119b, and heightens the vehicle's rear wheel steering in response to an applied lateral, horizontal force 300.

The elongation of said distance vector 112 that is perpendicular to said rear roll axis 109 by the angle of the chassis 1010 increases the force moment applied by the ground's reaction force 400b, and amplifies the said rear wheel's tilt motion.

The $3^{rd}$ said mechanism for enhanced rear wheel steering is based on applying an uneven vertical force 600 to the vehicle's chassis 1010, for example by applying most of the driver's weight to one side of the standing platform 114 (see FIG. 3).

The said applied uneven vertical force 600 to the vehicle's chassis 1010 and associated platform 114 causes the following:

The chassis 1010 pivots along the horizontal vector component 119b of roll axis 109 in relation to the middle suspension plate 110e, and the associated rear wheel set 1100.

The chassis' 1010 said pivot motion exerts a moment along the distance vector 120b, causing the wheel to yaw in the direction of turning along a vertical axis (line 119b), thus further heightening the vehicle's rear wheel steering. strive The wheels of the rear wheel set, which are normally driven by a common mechanical or electric force, tend to rotate at the same speed. For this reason, the effect of the said $1^{st}$ and $2^{nd}$ mechanisms for enhanced rear wheel steering, involving the application of a lateral, horizontal force may be dampened by the wheels' common drive force.

The $4^{th}$ mechanism for obtaining enhanced rear wheel steering is designed to tackle this issue, by combining the merits of the previously discussed mechanisms. It is based on translating a lateral, horizontal movement of the chassis 1010 to a tilt movement of the chassis 1010 along the rear roll axis 109, and exploiting the said $3^{rd}$ mechanism to produce a yaw motion of the rear wheels' set.

As discussed above in relation to FIG. 12c, the ball joint 110n is configured to translate a horizontal movement of the chassis 1010 to a tilt motion along the rear roll axis 109. Therefore, when the ball joint 110n is installed, a horizontal lateral force 300 applied to the chassis (e.g. by a driver swaying his/her body weight, as in a surfing motion) produces a tilt of the chassis 1010 and the associated standing platform 114 along the rear roll axis 109. The said tilt yaws the rear wheel set 1100 along the vertical line 119a, as explained in regards to the $3^{rd}$ mechanism, above. The said yaw further enhances the vehicle's rear wheel steering capability.

The production of rear wheel steering via the action of the ball joint 110n (i.e. by the effect of the said $4^{th}$ mechanism) is directly influenced by the number of installed ball joints 110n in the rear dynamic joint structure 100:

When no ball joints are installed, the $4^{th}$ mechanism will take no effect on the rear wheel steering.

When one ball joint 110n is installed, the $4^{th}$ mechanism will have a mild effect on the rear wheel steering.

When all ball joints 110n are installed, the $4^{th}$ mechanism will have a heightened effect on the rear wheel steering, enabling a driver to easily tilt the chassis 1010 and yaw the rear wheel set 1100 by applying a lateral, horizontal force to the chassis 1010.

The invented vehicle enables the driver to lock the rear wheels together in a synchronized mode, forcing the wheels to rotate at the same speed as in a differential lock. According to some embodiments, the said lock may be obtained electronically, by providing a synchronized electric control signal to both wheels of the rear wheel set. According to another embodiment, the said lock may be obtained mechanically, by physically associating the rear wheels through a joint axle.

A $5^{th}$ mechanism for enhanced rear wheel steering is based on this rear-wheel locking capability:

As well known to persons familiar with the art, locking of the rear wheels (as in a differential lock) produces superior traction, and is beneficial in specific types of terrain. However, such a lock limits the vehicle's steering capability. The invented vehicle overcomes the said limitation, while maintaining the property of superior traction.

When the rear wheels are locked, and the steering handle is turned, the chassis 1010 inertia produces a velocity vector that is not directly aligned with the vehicle's momentary direction of travel. The chassis 1010 inertia comprises a lateral velocity vector that is perpendicular to the vehicle's momentary direction of travel.

As discussed above, in relation to the $4^{th}$ mechanism for obtaining enhanced rear wheel steering, the ball joint 110n translates the said lateral velocity vector to a tilt of the chassis along the rear roll axis 109. This tilt, in turn, yaws the rear wheels in the required direction, as explained in relation to the $4^{th}$ mechanism for obtaining enhanced rear wheel steering.

As a result, locking the rear wheels, while steering the vehicle by the steering handle, causes the chassis 1010 to tilt along the rear roll axis, and yaw the rear wheels, thus enhancing the vehicle's rear wheel steering capabilities.

The invented vehicle provides the sensation of surfing to the steering of the vehicle. As described above, when the driver of the vehicle shifts their weight, the standing platform 114 is pivoted along the horizontal vector component 119B of roll axis 109. The said pivot action provides the user a surfing sensation as they steer the vehicle by swaying their weight from side to side.

The rigidity of the elastic joints 110a, 110b, 110c, 110d has an effect on the riding experience. Rigid joints will restrain the swivel of the standing platform 114, restrict the driver's ability to shift their weight and impose a constrained, stable quality to the ride. In a complementary manner, loose or soft elastic joints 110a, 110b, 110c, 110d will reduce the vehicle's stability, heighten steering capabilities, and provide an enhanced surfing sensation to the drive. According to some embodiments of the invented vehicle, the rigidity of the elastic joints 110a, 110b, 110c, 110d may be configurable. For example, they may be made of rubber, and their rigidity may be configured by tightening or loosening the elastic joint bolts 110k.

The sprung members of the suspension are hereby defined as the components that exhibit a fixed position in relation to the vehicle's chassis 1010. In the invented vehicle, the rear sprung members of suspension comprise the standing platform 114, shock absorber 105, upper and middle suspension plates 110f and 110e respectively, lower suspension connector 110i, elastic joints 110a, 110b, 110c, 110d, and elastic joint bolts 110k.

The unsprung members of the suspension are hereby defined as the components that bear the load between the ground and the shock absorber, and follow the terrain, i.e. present a fixed position in relation to the ground 101. In the invented vehicle, the rear unsprung members of suspension comprise of the rear wheel set 1100 (i.e. the tires 102, the wheel disks 103 and the wheel hubs 104) and the axle 115.

Figure 15:
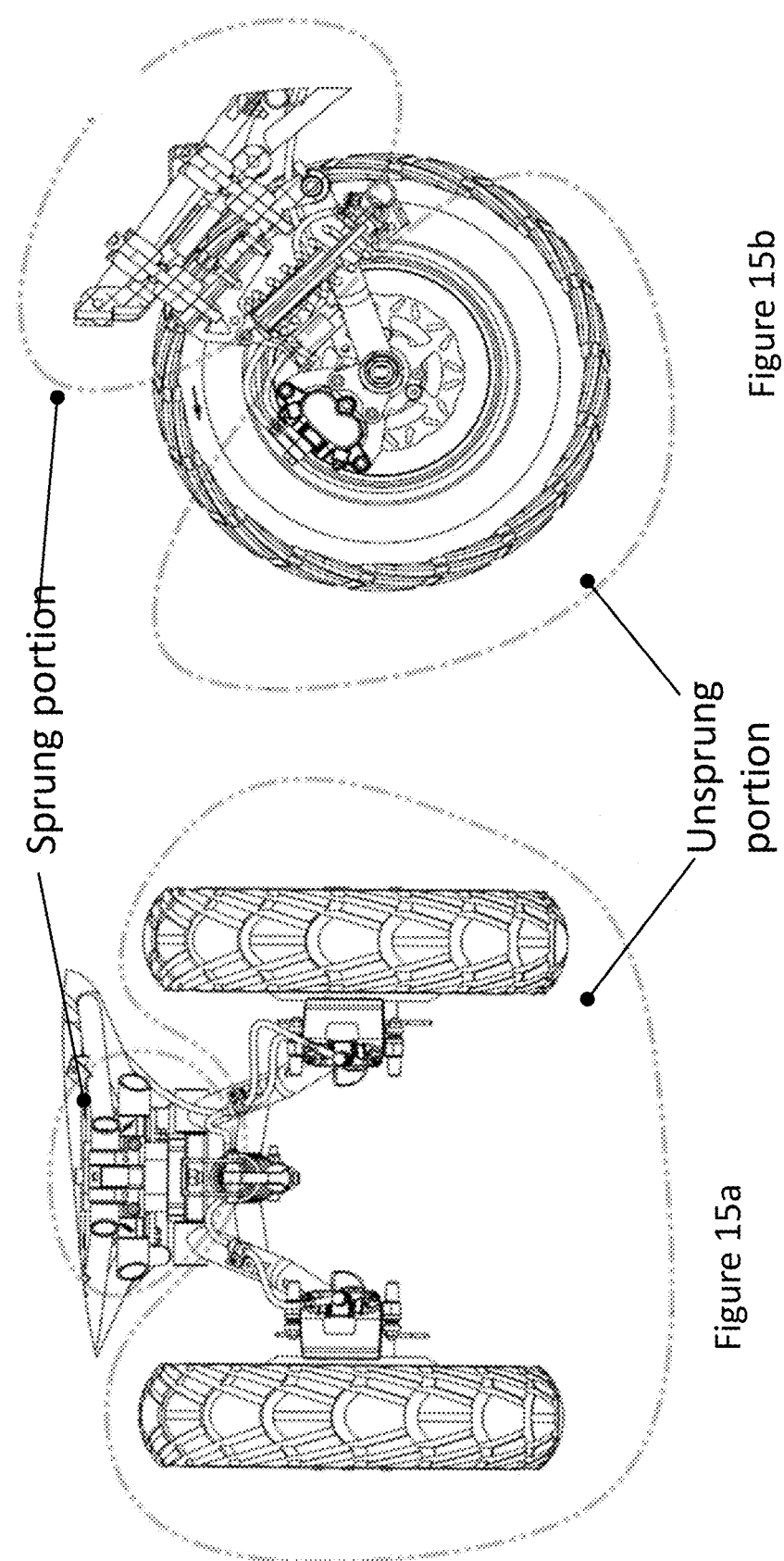
FIGS. 15a and 15b respectively show a rear view and a lateral section view of the rear end of the vehicle, depicting a schematic division of the different components of the rear suspension part to a sprung portion and an unsprung portion, according to some embodiments.

FIGS. 15a and 15b respectively show a rear view and a lateral section view of the rear end of the vehicle, depicting a schematic division of the different components of the rear suspension part to a sprung portion and an unsprung portion, according to some embodiments.

This embodiment of the rear suspension part provides a unique shock absorption mechanism that enables the vehicle to closely follow a rugged terrain, while maintaining a smooth driving experience.

The unsprung members of the rear suspension are minimal. They include only the rear wheel set 1100 and the rear axle 115, and do not include the top and middle suspension plates (110f and 110e), the elastic joint components 110a, 110b, 110c, 110d, or the elastic joint bolts 110k. This property of the rear suspension's unsprung portion reduces the unsprung portion's mass, and facilitates close and rapid following of the terrain through pitch movement of the rear pitch pivot axle 117.

Shocks applied to the unsprung components are absorbed by the shock absorber 105. The shock absorber primarily damps shocks in the pitch direction. The current invention does not impose any restrictions on the type of the said shock absorber (e.g. hydraulic, pneumatic, springs etc) or any combination thereof. The elastic joints 110a, 110b, 110c, 110d provide additional shock absorption, damping shocks mainly in the roll direction.

According to this embodiment, the sprung components are further divided by the elastic joints 110a, 110b, 110c, 110d in regards to movement in the roll axis:

The shock absorber 105 and the middle suspension plate 110e follow the terrain's roll movement.

The elastic joints 110a, 110b, 110c, 110d cushion the terrain's roll movements, such that all other components of the vehicle's sprung mass advance smoothly over the terrain, cushioned in both the pitch and roll axes.

The number of components located between the ground and the elastic joints 110a, 110b, 110c, 110d is minimal. They include the unsprung components (tires 102, wheel disks 103, wheel hubs 104 and axle 115), the shock absorber 105 and the middle suspension plate 110e. This implementation ensures a minimal mass between the ground and the elastic joints 110a, 110b, 110c, 110d, facilitating a smooth roll movement to follow the rugged terrain.

Figure 16:
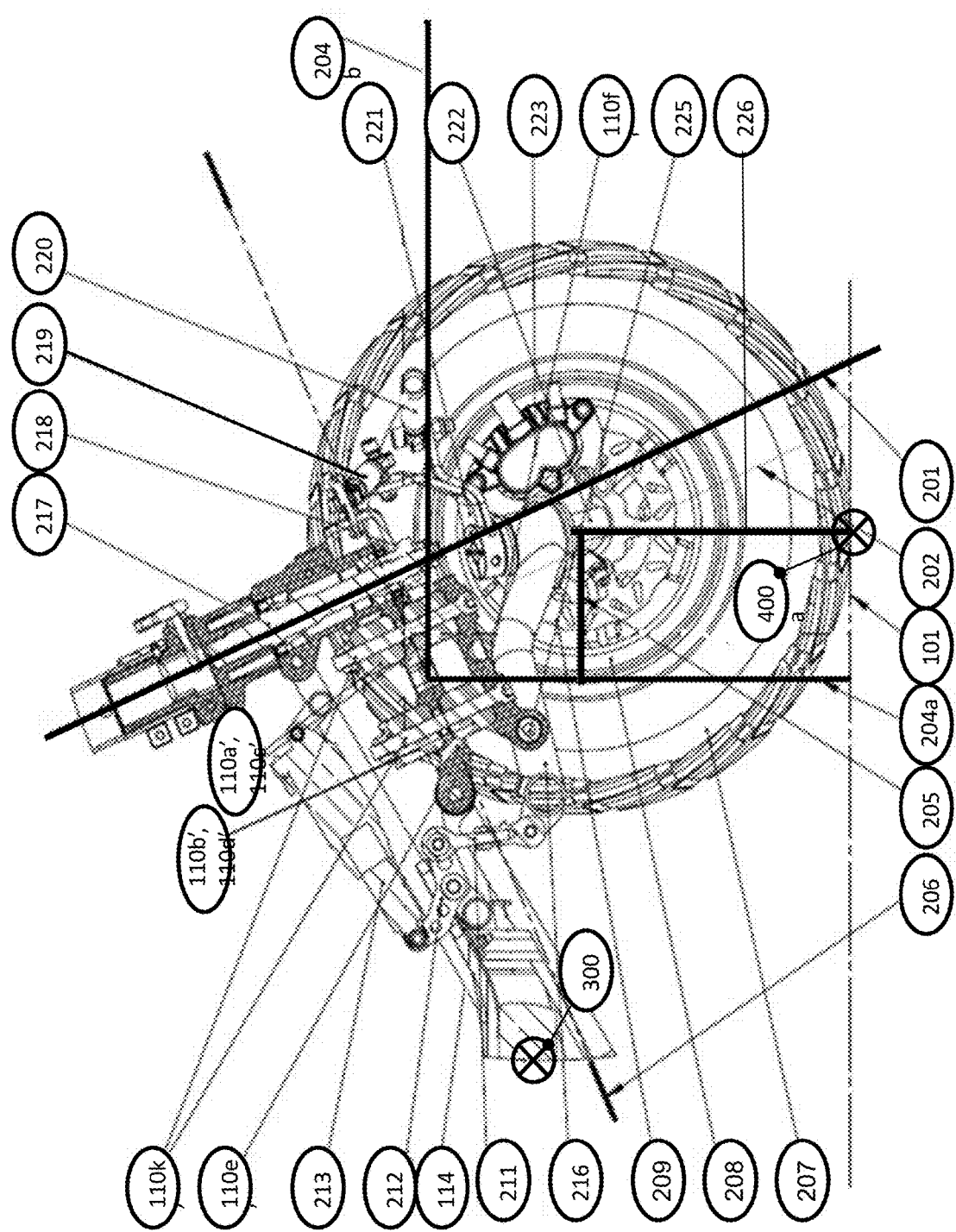
FIG. 16 presents a detailed lateral section view of the front end of the vehicle, according to some embodiments.

FIG. 16 presents a detailed lateral section view of the front end of the vehicle, according to some embodiments. In this figure, the proximal wheel parts have been removed to provide a clear view of the structure.

The present invention makes use of several mechanisms for producing an enhanced front-wheel steering experience. It is important to note the following structural properties depicted in FIG. 16, in order to understand the said different mechanisms for enhanced front-wheel steering:

The front wheel set 1200 is not explicitly marked in FIG. 16. It comprises at least part of: the tires 207, the wheel disks 208, and the disk brakes 209 and brake pistons 223.

Line 226 is substantially perpendicular to the ground. It intercepts the wheel's contact point with the ground, marking the position through which the ground's reactive force's action line passes.

The vehicle's chassis 1010 is angled upwards, towards the front of the vehicle, parallel to the front roll axis 206.

The said angled structure displaces the midpoint of the front wheels from beneath the front elastic joints' set 110a', 110b', 110c', 110d' to an extended position towards the front of the vehicle.

The vertical Line 204a is perpendicular to the ground, and intercepts the front roll axis 206.

According to the embodiment depicted in FIG. 16, wherein the dynamic joint structure 200 comprises two pairs of elastic joints (110a', 110c' and 110b', 110d'), the vertical line 204a intercepts the front roll axis 206 at substantially the midpoint between the two bolts 110k', i.e. between elastic joints pairs 110a', 110c' and 110b', 110d'.

According to other embodiments, wherein the dynamic joint structure 200 only comprises a single pair of elastic joints (110a', 110b', see FIG. 4), the vertical line 204a intercepts the front roll axis 206 at the location of the single pair of elastic joints 110a', 110b'.

Horizontal Line 204b is parallel to the ground, and intercepts the front roll axis 206 substantially at the mid-point between the bolts 110k'.

Line 205 is the wheels yaw force moment's distance vector. This distance vector is elongated as the angle of the front roll axis 206 is increased.

The $1^{st}$ said mechanism for enhanced front wheel steering is based on applying a lateral, horizontal force 300 on the chassis 1010. Such a force 300 may be applied, for example by laterally swaying the driver's weight as in a surfing motion, or by steering the vehicle in a sharp turn (e.g. by using the steering handle) and thus producing a lateral centrifugal force.

The ground 101 reacts to the applied lateral force 300 by a reactive, friction force 400a (see FIG. 7), originating from the wheel's point of contact with the ground (marked by line 226).

The combination of the applied, lateral, horizontal force 300 and the ground's reaction force 400a (see FIG. 7) produces a force moment, acting along distance vector 205. This force moment causes the front wheel set 1200 to yaw along the vertical line 204a, and heightens the effect of front wheel steering in response to an applied lateral, horizontal force 300. The elongation of distance vector 205 by the angle of the front roll axis 206 increases the force moment applied by the ground's reaction force 400a, and amplifies the said yaw motion.

The $2^{nd}$ said mechanism for enhanced front wheel steering is based on applying an uneven vertical force 600 to the vehicle's chassis 1010, for example by applying most of the driver's weight to one side of the standing platform 114 (see FIG. 3).

The said applied uneven vertical force 600 to the vehicle's chassis 1010 and associated platform 114 causes the following:

The chassis 1010 pivots along the horizontal vector component (marked by line 204b) of the front roll axis 206, in relation to the front wheel set 1200.

The chassis' 1010 said pivot motion exerts a moment along the distance vector 205, causing the wheel to yaw in the direction of turning along a vertical axis 204a, thus further heightening the effect of front wheel steering.

The $3^{rd}$ mechanism for obtaining enhanced front wheel steering combines the merits of the previously discussed mechanisms. It is based on translating a lateral, horizontal movement of the chassis 1010 to a tilt movement of the chassis 1010 along the front roll axis 206, and exploiting the said $2^{nd}$ mechanism to produce a yaw motion of the front wheels set.

As discussed above in relation to FIG. 12c, the ball joint 110n' is configured to translate a horizontal movement of the chassis 1010 to a tilt motion along the front roll axis 109. Therefore, when the ball joint 110n' is installed, a horizontal lateral force 300 applied to the chassis (e.g. by a driver swaying their body weight, as in a surfing motion) will produce a tilt of the chassis 1010 and the associated standing platform 114 along the front roll axis 109. The said tilt will, in turn, cause the front wheel set 1100 to yaw along the vertical line 204a, as explained in regards to the $2^{nd}$ mechanism, above. The said yaw will further enhance the vehicle's front wheel steering capability.

The production of front wheel steering via the action of the ball joint 110n' (i.e. by the effect of the said $3^{rd}$ mechanism) is directly influenced by the number of installed ball joints 110n' in the front dynamic joint structure 200:

When no ball joints are installed, the $3^{rd}$ mechanism will take no effect on the front wheel steering.

When one ball joint 110n' is installed, the $3^{rd}$ mechanism will have a mild effect on the front wheel steering.

When both ball joints 110n are installed, the $3^{rd}$ mechanism will have a heightened effect on the front wheel steering, enabling a driver to easily tilt the chassis 1010 and yaw the front wheel set 1100 by applying a lateral, horizontal force to the chassis 1010.

The members of the unsprung portion of the front wheel suspension are minimal. They include the wheel sets (i.e. tires 207, wheel disks 208, disk brakes 209 and brake pistons 223) and the front axle 216. They do not include the shock absorber 213, extensions to the shock absorber 211 and 212, upper and middle suspension plates 110f and 110e' respectively, elastic joints 110a', 110b', 110c', 110d', elastic joint bolts 110k', and the handle joints 217.

This property of the front wheel suspension's unsprung portion reduces the unsprung portion's mass, and facilitates close and rapid following of the terrain through pitch movement of the front shock absorber 213.

Shocks applied to the unsprung components are absorbed by the shock absorber 213. The shock absorber primarily damps shocks in the pitch direction. The current invention does not impose any restrictions on the type of the said shock absorber (e.g. hydraulic, pneumatic, springs etc) or any combination thereof. The elastic joints 210 provide additional shock absorption, damping shocks mainly in the roll direction.

Aspects of disclosed embodiments, pertain to a dynamic joint structure (DJS) for movably connecting a wheel set of a vehicle to a chassis of the vehicle where the vehicle includes, a steering and control unit, one or more motors such as electric motors, a rear wheel set, a front wheel set, a base structure disposed between the rear and the front wheel sets, where the DJS includes a restriction mechanism for restricting the relative movement between the upper suspension plate and the middle suspension plate of the DJS especially along a specific plane, ultimately for causing a maximal part (torque) of a tilting movement of the base structure (and chassis thereof) of the vehicle to be translated through the DJS into a (steering) rotational movement of the wheels connecting to the base structure through the specific DJS, about a Z axis that is perpendicular to the ground over which the vehicle is located—for example, for enabling a driver standing over the base structure, to steer the vehicle by controlling the tilting position of the base structure (similar to a surfing steering movements), e.g. by diverting his/her weight towards one side of the base structure for steering the vehicle to the same respective side and optionally also vice versa—causing tilting of the base structure in response to steering/turning of the wheels.

According to some embodiments, the DJS may include: (i) an upper suspension plate having at least one upper recess with at least one upper opening; (ii) a middle suspension plate having at least one middle recess with at least one middle opening; and (iii) at least one connector assembly having a restriction mechanism.

The connector assembly may include, for example: (a) an elongated bolt, which may be in a shape of a cylindrical bolt (similar to bolt 110b) with a protruding head section and a cylindrical led section, which has an elongated structure defining an insert axis "Zi" along its longer side defining, for example, the cylindrical symmetry of the bolt; and (b) a restriction unit comprising an elastic element such as a spherical elastic (e.g. rubber or sponge) element positioned around an area of the bolt, and a ring element configured and located to surround the elastic element. For example, the connector assembly components may form a bull's eye bearing/joint assembly for restricting the movement of the bolt in the plane that is perpendicular to the insert axis Zi, encouraging the bolt to translate tilt of the chassis connected thereto into rotational movements about the Zi axis, ultimately for having the rotational movement of the bolt about the axis Zi to be translated into a rotational/pivotal movement of the wheels around an axis Z that is perpendicular to the ground, for steering the vehicle.

According to some embodiments, the dimensions, geometry and/or size of the ring element may be designed to tightly engage an outer periphery of the elastic element at an inner side of the ring element, and to engage walls of the upper opening of the upper middle recess of the middle suspension plate.

Figure 17:
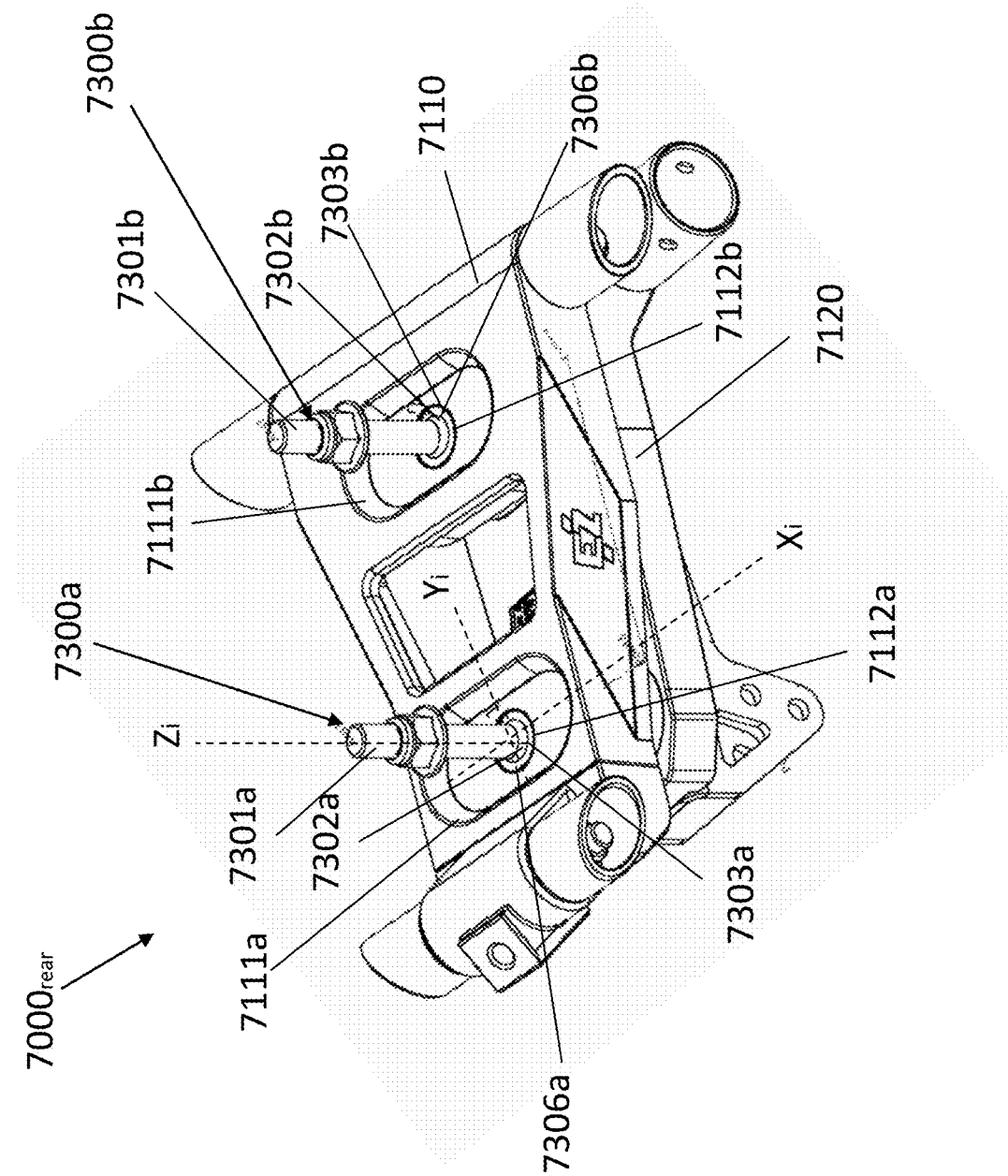
FIG. 17 shows a dynamic joint structure (DJS) of a vehicle having two suspension plates connected to one another via two connector assemblies, each connector assembly including a bolt and a restriction unit for restricting the bolt movement within an opening of the upper plate of the DJS, according to other embodiments.
Figure 18C:
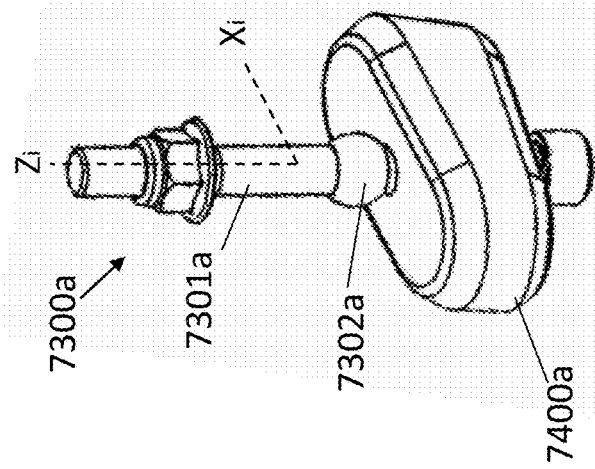
FIGS. 18A-18D show the connector assembly with a bull's eye bearing bull's eye bearing restriction unit or components thereof, according to other embodiments.
Figure 18B:
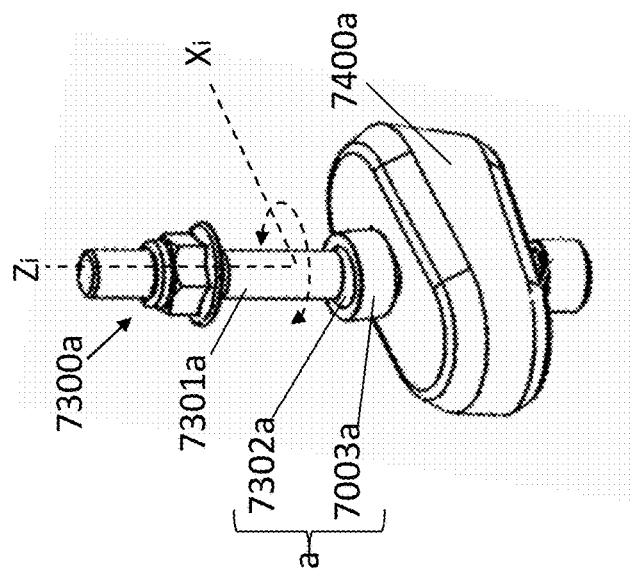
Figure 18D:
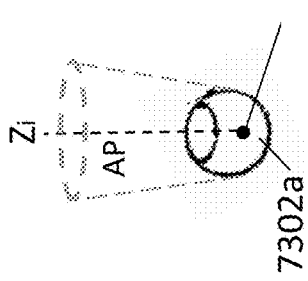
Figure 18A:
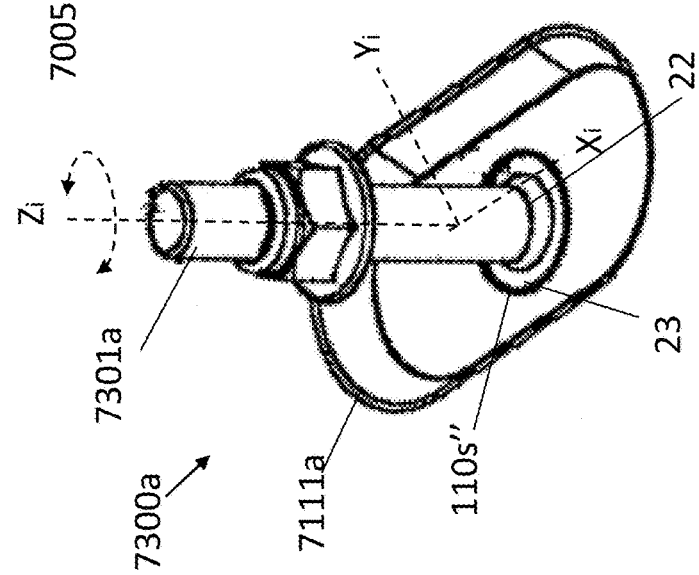

Reference is made to FIG. 17 showing a dynamic joint structure (DJS) $7000_{rear}$ for movably connecting the rear wheel set of a vehicle with the chassis of the base structure of the vehicle. The DJS $7000_{rear}$ having two connector assemblies 7300a and 7300b, each with a restriction mechanism for enabling translation of tilting motion of a base structure to which the DJS $7000_{rear}$ connects at one side thereof will be translated into a steering motion of a wheels set connecting to the DJS $7000_{rear}$ at another side thereof, according to some embodiments.

The DJS $7000_{rear}$ includes a upper suspension plate 7110 and a middle suspension plate 7120 movably connectable to one another, two connecting assemblies: 7300a and 7300b for movably connecting the upper suspension plate 7110 to the middle suspension plate 7120, via at least two buffers (not shown) which may be made from an elastic and/or shock absorbing material such as rubber or sponge. According to some embodiments, the upper suspension plate 7110 includes two recesses: 7111a and 7111b, each having an opening 7112a and 7112b respectively for receiving therethrough a respective bolt 7301a/7301b.

As shown in FIG. 17 each connector assembly 7300a/7300b includes: a bolt 7301a/7301b, which may be a cylindrical bolt with a protruding head defining a Zi axis as the symmetry axis of the cylinder; an elastic element 7302a/7302b, which may be a spherical ring encircling the lower section of the bolt 7301a/7301b; and a ring element 7303a/7303b, encircling and holding the elastic element 7302a/7302b and positioned between the elastic element 7302a/7302b and an inner wall of the respective opening 7112a/7112b.

FIGS. 18A-18D show one of the connector assemblies 7300a with a bull's eye bearing restriction unit 7306a, according to some embodiments. The upper suspension plate 7110 includes a recess 7111a (in this case an oval/elliptic recess 7111a with an opening (hole) 71112a for enabling threading therethrough the respective bolt 7301a. In this exemplary case, the openings 7112a/7112b are both circular enabling the bolt 7301a (if left unrestricted) to move along a XiYi plane that is perpendicular to the Zi axis. In other cases, each of the openings may be oval/elliptic or rectangularly shaped such as to form a single axis (e.g. Xi or Yi) along which the bolt 7301a can move if unrestricted.

According to some embodiments, the elastic element 7202a/7202b (see a detailed view of the elastic element 7202a in FIGS. 18C and 18D) may be an elastic spherical ring encircling the lower section of the bolt 7301a or may be a spherical bearing fixedly connected to a lower edge of the bolt 7301a. According to some embodiments, the spherical elastic element 7302a/7302b may be connected or engaging the bolt 7301a/7301b such as to prevent or restrict it from making any lateral movement in the XiYi plane and only allow the bolt 7301a/7301b to rotate at a limited aperture AP about a center point CP located at the center of the elastic element 7302a sphere (see FIG. 18D), along the Zi axis. The size of the aperture AP of rotation may depend also on the inner diameter of the ring element 7303a/7303b.

According to some embodiments, the lower part of the bolt 7301a may also be threaded through a buffer 7400a, which may be made from elastic and/or shock absorbing materials such as rubber, polymeric sponge-like materials for mediating between the upper suspension plate 7110 and the middle suspension plate 7120. According to some embodiments, the buffer 7400a may have a sloped shape changing in height (Zi level) along the XiYi plane for enabling the suspension plates 7110 and 7120 to form a non-zero angle therebetween e.g. along the Xi axis.

The front DJS may have the same parts as those of the rear DJS $7000_{rear}$ with changes in structural design suitable for connecting the front wheels set of the vehicle to the front side of the vehicle's chassis/base structure as well as to receive or connect to a steering connector/bar of the vehicle etc.

Figure 19:
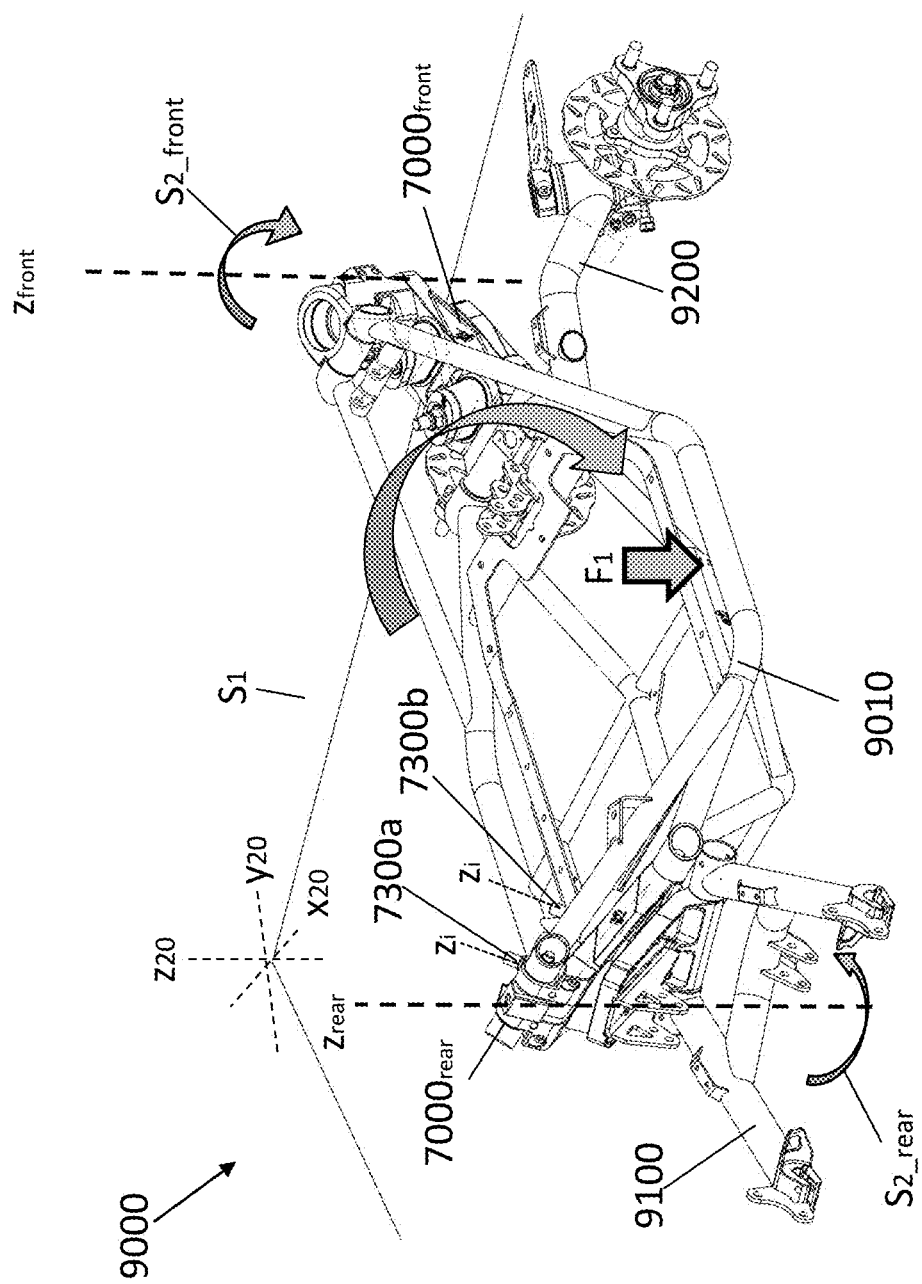
FIG. 19 shows a road vehicle having a front and a rear DJSs connecting their chassis to their front and rear wheel sets, respectively, where each DJS includes at least one connector assembly with a restriction unit, configured for restricting movement of at least one bolt, for enhancing front and/or rear wheels steering along a plane XY that is parallel to the road/ground, upon tilting movements applied to the chassis, according to some embodiments.

Reference is now made to FIG. 19 showing some parts of a road vehicle 9000 having front and rear DJSs $7000_{front}$ and $7000_{rear}$, respectively, each having two connector assemblies 7300a and 7300b with restriction units 7306a and 7306b, for restricting at least lateral movement of the bolt 7301a/7301b in the Xi and/or Yi axis, according to some embodiments.

The rear DJS $7000_{rear}$ may be configured to dynamically/movably connect the rear wheels set 9100 of the vehicle 9000 to a rear part of the vehicle's chassis 9010; and the front DJS $7000_{rear}$ may be configured to dynamically/movably connect the front wheels set 9200 of the vehicle 9000 to a front part of the vehicle's chassis 9010.

The restriction of the movement of the bolts 7301a and 7301b of the front and rear connector assemblies 7300a/7300b of the respective front and rear DJSs $7300_{front}$ and $7300_{rear}$, at the XiYi planes that are perpendicular to each respective Zi axis of each respective connector assembly, forces each of the bolts 7301a/7301b to only rotate about a central point. This in turn causes a tilting movement of the chassis 9010 (and of the base structure (not shown) to which the chassis 9010 connects, to cause the rear and/or front wheels set 9100/9200 to steer e.g. by rotating about an axis $Z_{19}$ that is perpendicular to a ground plane $X_{19}Y_{19}$, over which the vehicle 90000 is positioned.

For example, as shown in FIG. 19, a force F1 applied (e.g. by a driver/rider of the vehicle 9000) over one side of the chassis 9010 will cause the chassis 9010 to tilt in a tilting rotational movement S1, causing thereby, due to the bolts' lateral movements restriction, the rear wheels set 9100 to rotate about an axis $Z_{rear}$ that is parallel to $Z_{19}$ (i.e. to rotate over a plane perpendicular to the axis $Z_{rear}/Z_{19}$), and/or the front wheels set 9200 to rotate about an axis $Z_{front}$ that is parallel to $Z_{19}$ (i.e. to rotate over a plane perpendicular to the axis $Z_{front}/Z_{19}$)—for enabling experienced drivers to steer the vehicle 9000 based on their body movements for tilting the base structure over which they stand (e.g. by tilting their footstep/body towards one side or the other for steering the vehicle to turn to one side or the other, accordingly).

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments and/or by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

Although the invention has been described in detail, nevertheless changes and modifications, which do not depart from the teachings of the present invention, will be evident to those skilled in the art. Such changes and modifications are deemed to come within the purview of the present invention and the appended claims.

The invention claimed is:

1. A dynamic joint structure for movably connecting a wheel set of a vehicle to a chassis of the vehicle, the vehicle comprising a rear wheel set, a front wheel set, a base structure disposed between the rear and the front wheel sets and a chassis framing the base structure, the dynamic joint structure comprising:

an upper suspension plate having at least one upper recess with at least one upper opening;

a middle suspension plate having at least one middle recess with at least one middle opening; and at least one connector assembly comprising:

a bolt, which has an elongated structure defining an insert axis "Zi" along its longer side; and a restriction unit comprising an elastic element positioned around an area of the bolt, and a ring element configured and located to surround the elastic element, wherein the connector assembly is configured such that the bolt is to be inserted through the at least one upper and middle openings of the upper and middle suspension plates, respectively, wherein the restriction unit is configured and located such as to restrict movement of the bolt, in a plane XiYi that is perpendicular to the insert axis Zi, for translating tilt of the chassis to a pivotal movement of the bolt about the inset axis Zi, for translating tilting movements of the vehicle's chassis, around a Z axis, which is perpendicular to a ground plane XY over which the vehicle is positioned, into steering movements of the wheels set to which the respective dynamic joint structure connects.

2. The dynamic joint structure according to claim 1, wherein the bolt of the restriction unit has a cylindrical section having a cylindrically symmetry around the axis Zi.

3. The dynamic joint structure according to claim 2, wherein the elastic element of the restriction unit is symmetrically arranged around the circumference of at least part of the cylindrical section of the bolt.

4. The dynamic joint structure according to claim 1, wherein the dimensions, geometry and/or size of the ring is such as to tightly engage an outer periphery of the elastic element at an inner side of the ring element, and to engage walls of the upper opening of the upper middle recess of the middle suspension plate.

5. The dynamic joint structure according to claim 1 further comprising at least one elastic buffer, configured to be inserted into the recess of the middle suspension plate such as to buffer between the upper and middle suspension plates.

6. The dynamic joint structure according to claim 5, wherein the buffer has a sloped shape changing height in respect to the insert axis Zi.

7. A vehicle comprising:

a drive-control assembly comprising at least a steer element, a controller, and a steering connector connecting at one end thereof to the steering element;

a base structure comprising a chassis and a support platform, the chassis being connected to a lower end of the steering connector, wherein the chassis is further configured to frame the support platform and the support platform is configured to support thereover a load;

a front wheel set comprising two front wheels and a front connecting unit connectable to the front wheels at a first side thereof;

a rear wheel set, comprising two rear wheels and a rear connecting unit connectable to the rear wheels at a first side thereof;

one or more motors for driving the wheels, the one or more motors being controllable via the controller;

a front dynamic joint structure (DJS) configured to movably connect the front wheel set to a front side of the chassis; and a rear DJS configured to movably connect the rear wheel set to a rear side of the chassis, wherein each dynamic joint structure (DJS) comprises:

an upper suspension plate having at least one upper recess with at least one upper opening;

a middle suspension plate having at least one middle recess with at least one middle opening; and at least one connector assembly comprising a bolt, which has an elongated structure defining an insert axis "Zi" along its longer side; and a restriction unit comprising an elastic element positioned around an area of the bolt, and a ring element configured and located to surround the elastic element, wherein the at least one connector assembly is configured such that the bolt is to be inserted through the at least one upper and middle openings of the upper and middle suspension plates respectively, wherein the restriction unit is configured and located such as to restrict movement of the bolt, in a plane XiYi that is perpendicular to the insert axis Zi, for translating tilt of the chassis to a pivotal movement of the bolt about the inset axis Zi, for translating tilting movements of the vehicle's chassis, around a Z axis, which is perpendicular to a ground plane XY over which the vehicle is positioned, into steering movements of the wheels set to which the respective dynamic joint structure connects.

8. The vehicle according to claim 7, wherein the bolt of the restriction unit has a cylindrical section having a cylindrically symmetry around the axis Zi.

9. The vehicle according to claim 8, wherein the elastic element of the restriction unit is symmetrically arranged around the circumference of at least part of the cylindrical section of the bolt.

10. The vehicle according to claim 7, wherein the dimensions, geometry and/or size of the ring of the restriction unit is such as to tightly engage an outer periphery of the elastic element at an inner side of the ring element, and to engage walls of the upper opening of the upper middle recess of the middle suspension plate.

11. The vehicle according to claim 7, wherein each of the front and/or rear dynamic joint structure further comprises at least one elastic buffer, configured to be inserted into the recess of the middle suspension plate such as to buffer between the upper and middle suspension plates.

12. The vehicle according to claim 11, wherein the buffer has a sloped shape declining in height in respect to the insert axis Zi.

13. The vehicle according to claim 7, wherein each wheel is rotatable by a separate motor, each motor being separately controllable by the controller of the drive-control assembly.

* * * * *